(12) United States Patent
Webb et al.

(10) Patent No.: US 6,424,764 B1
(45) Date of Patent: Jul. 23, 2002

(54) COMPACT WAVEGUIDE MODE CONTROL AND CONVERTER DEVICES

(75) Inventors: Kevin J. Webb, West Lafayette, IN (US); Tanveer U. Haq, Herndon, VA (US); Neal C. Gallagher, Bel Air, MD (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/318,788

(22) Filed: May 25, 1999

Related U.S. Application Data

(62) Division of application No. 08/785,762, filed on Jan. 18, 1997, now Pat. No. 5,942,956.
(60) Provisional application No. 60/010,160, filed on Jan. 18, 1996.

(51) Int. Cl.$^7$ .................................................. G02B 6/26
(52) U.S. Cl. .......................................... 385/28; 385/27
(58) Field of Search ...................... 385/27–30; 372/96, 372/45, 36; 315/5.41

(56) References Cited

U.S. PATENT DOCUMENTS 3,153,767 A * 10/1964 Kyhl ........................ 315/5.41
4,603,420 A * 7/1986 Nishizawa et al. ........... 372/45
5,812,571 A * 9/1998 Peters ........................ 372/96

* cited by examiner

Primary Examiner—Ellen E. Kim
(74) Attorney, Agent, or Firm—Thelen Reid & Priest LLP; David B. Ritchie

(57) ABSTRACT

A mode control device for operation at a selected wavelength in cooperation with first and second waveguides, integrates first and second adjacent layers for passing electromagnetic energy from the first waveguide to the second waveguide through the layers in series. In a first embodiment, the first and second layers are composed of materials having a distinct indices of refraction and are spaced apart a distance other than one-quarter of said selected wavelength. In a second embodiment, the layers are disks having distinct circular diameters.

1 Claim, 17 Drawing Sheets

Frequency: 3.5 GHz
Waveguide Height: 15cm
Efficiency: 99.47%
Length: 45.38cm

|  | Design 1 | Design 2 | Design 3 |
|---|---|---|---|
| Efficiency | 99.47% | 99.78% | 99.77% |
| Length | 45.58 cm | 67.5 cm | 59.4 cm |
| Bandwidth (for 1% efficiency change) | 2 MHz | 12 MHz | 14 MHz |
| Fabrication Tolerance (for 1% efficiency change) |  |  |  |
| Step heights | ± 0.07 mm | ± 0.3 mm | ± 0.7 mm |
| Step lengths | Not very sensitive | Not very sensitive | Not very sensitive |
| Optimization grid size | 1 mm | 2 mm | 3 mm |

|  | Previous Design | Present Design |
|---|---|---|
| Length: | 18 cm | 9 cm |
| Conversion Efficiency | 97.6% | 97.86% |

|  | Previous Design | Present Design |
|---|---|---|
| Length: Conversion Efficiency | 107 cm 98.3% | 79 cm 96.1% |

|  | Design 1 | Design 2 |
|---|---|---|
| Efficiency | 99.5% | 99.27% |
| Length | 2.5" | 3.0" |
| Bandwidth (for 1% efficiency change) | 35 MHz | 20 MHz |
| Fabrication Tolerance (for 1% efficiency change) Step heights | ±0.15 mm | ±0.1 mm |
| Step lengths | Not very sensitive | Not very sensitive |
| Optimization grid size | 3 mm | 3 mm |

FIG. 27

COMPACT WAVEGUIDE MODE CONTROL AND CONVERTER DEVICES

REFERENCE TO RELATED PROVISIONAL PATENT APPLICATION

This application claims the benefit of U.S. Provisional Patent Application Serial No. 60/010,160 filed Jan. 18, 1996, the entirety of which is hereby incorporated herein by reference as if set forth in full herein.

CROSS REFERENCE TO RELATED APPLICATION

This application is a Divisional of co-pending U.S. patent application Ser. No. 08/785,762 filed on Jan. 18, 1997 entitled "Design Method for Compact Waveguide Mode Control and Converter Devices", in the name of inventors Tanveer Ul Haq, Kevin J. Webb and Neal C. Gallager, issued as U.S. Pat. No. 5,942,956 on Aug. 24, 1999.

BACKGROUND OF THE INVENTION

1. Field of the Invention

The invention is directed to the field of microwave and optical waveguides. More particularly, the invention is directed to methods for designing compact mode control and converter elements for use with microwave and optical waveguides.

2. The Background Art

Mode control and conversion devices find wide application, for example, in microwave heating of plasmas for fusion experiments, multi-mode feeds for RADAR systems, microwave waveguide transitions, couplers and mode filters, microwave waveguide mode launchers for waveguide transmission systems and for laboratory demonstrations, microwave heating systems and optical waveguide couplers, mode converters and mode filters optical and microwave gratings, holographic elements, filters, phase shifters and the like.

Mode converters have been extensively used to convert outputs of high power microwave sources into lower order modes for plasma heating and low loss microwave transmission.

Currently, periodic gratings are used for conversion of modes in highly overmoded circular waveguides. These gratings are formed by periodically varying the waveguide radius resulting in a rippled wall structure and are usually analyzed by coupled mode theory. Such rippled wall structures result in very slight periodic field perturbations. Very high efficiencies have been reported for these gratings, but their lengths remain large compared to the waveguide transverse dimension. Various techniques have been implemented to reduce the length of these gratings, but the overall conversion length remains limited by the grating period. Minimal scattering occurs in such designs and a minimum achievable conversion length appears to be equal to one grating period. See, e.g., K. Kumric, et al., "Optimization of Mode Converters for Generating the Fundamental $TE_{01}$ Mode from $TE_{06}$ Gyrotron Output at 140 GHz," *International Journal of Electronics*, Vol. 64 (January 1988), pp. 77–94, and M. J. Buckley et al., "Compact Quasi-Periodic and Aperiodic $TE_{ON}$ Mode Converters in Overmoded Circular Waveguides for use with Gyrotrons," *I.E.E.E. Transactions of Microwave Theory and Techniques*, Vol. 38, No. 6 (June, 1990), pp. 712–721. Similar structures in the form of gratings have been designed for optical waveguides. See, e.g., D. Marcuse, "Mode Conversion Caused by Surface Imperfections of a Dielectric Slab Waveguide," *Bell Systems Technical Journal* (December, 1969) pp. 3187–3215. All of these converter designs are relatively lengthy when compared to the radial dimension of the waveguide. A typical periodic grating mode converter is diagrammed in FIG. 1. In FIG. 1 a first input electromagnetic wavefront 10 is applied to the converter 12. The first wavefront 10 is formed of one or more modes. After interaction with converter 12, which is much longer than it is wide, a second electromagnetic wavefront 14 of the selected modality is output from converter 12. Such converters are typically 95–99.5% efficient.

Mode filters for high power microwave sources whose output power is distributed in various modes, permit extraction of a single mode at the output. Previous designs have not proven themselves particularly efficient. See, e.g., J. P. Tate, et al., "Experimental Proof-of-Principal Results on a Mode-Selective Input Coupler for Gyrotron Applications", *I.E.E.E. Transactions on Microwave Theory and Techniques*", Vol. 42, No. 10 (October 1994), pp. 1910–1917, and U.S. Pat. No. 3,771,078 dated Nov. 6, 1973 to H. G. Kidner, et al.

Mode launchers for efficiently exciting a specific mode into an overmoded waveguide can be difficult to construct. However, for a single mode waveguide only one mode survives and thus the mode purity is ensured.

Waveguide adapters, such as tapered sections, are generally used to join waveguides of unequal radial dimensions. Due to a gradual taper these devices are very long as compared to the radial waveguide dimension. See, e.g., W. A. Huting et al., "Numerical Solution of the Continuous Waveguide Transition Problem," *I.E.E.E. Transactions on Microwave Theory and Techniques,* Vol. 36, No. 11 (November 1989), pp. 1802–1807.

Grating couplers can be used to couple free space light into an optical waveguide or vice versa and also for coupling between adjacent waveguides. See, e.g., Nishihara, Haruna and Suhara, "Optical Integrated Circuits", McGraw-Hill Optical and Electro-optical Engineering Series, 1989.

Accordingly, a method for designing more compact, yet equally efficient mode converters and control elements for microwave and optical applications would be highly desirable.

SUMMARY OF THE INVENTION

The present invention is directed toward the design of an aperiodic grating for mode conversion (defined as any operation on an input set of modes) which is based upon an inverse scattering optimization procedure. In accordance with this method, no predetermined shape of the grating structure is assumed. A constrained domain of all surfaces is searched to find an optimum aperiodic conversion surface profile for maximum conversion efficiency into the required output mode(s). Accordingly, the present method results in the design of rough surfaces or non-homogeneous structures for mode conversion. Because this method relies on scattering produced by short, forceful field perturbations, it is possible to achieve very small conversion lengths which are much less than one grating period. Precisely because periodic structures are not initially assumed, compact or rough structures are generally obtained. This method can be used to design mode converters, mode filters, waveguide adapters, mode launchers, power splitters and combiners, phase shifters and aperiodic gratings for use as couplers in optical waveguides. Efficiencies close to the theoretical maximums are obtainable with this method.

The structures achieved by this method have a narrow bandwidth of operation and therefore are suitable to the design of filters.

It is known that whenever an obstruction is placed in the path of an electromagnetic wave, the energy is scattered into various modes. Such an obstruction can be created in a waveguide by varying its dimensions or by changing the material of the dielectric inside it. The method of the present invention is directed at finding an optimum scattering surface that will scatter essentially all of the energy in the input mode(s) into one mode or a set of modes desired at the output. The following steps are used to design such a surface:

1. Specify the application of the device (i.e., the frequency of operation, type of device, structure, and size of the input and output waveguides, the mode composition of the incident electromagnetic field and the required mode composition of the output electromagnetic field);
2. Pick a method of variation (i.e., variation of waveguide shape only, variation of only the material properties of the obstruction or variation of both the shape and the material);
3. Choose the material to be used for the obstruction;
4. Decide the directions in which the obstruction and/or waveguide shape and material must vary;
5. Pick a suitable basis function to represent the waveguide shape and/or material properties in each of the waveguide dimensions;
6. Choose an initial structure approximation (i.e., give some arbitrary (but realistic) values to all the variables (coefficients) in the series representations and pick a length, L, for the structure);
7. Formulate the forward solution;
8. Perform a global optimization to find values of the coefficients that maximize the output power in the desired output mode(s);
9. (Optional) Obtain multiple designs (i.e., repeat steps 5 through 8 to come up with a number of designs and select an optimal design under the circumstances); and
10. Fabricate the device.

OBJECTS AND ADVANTAGES OF THE INVENTION

Accordingly, it is an object and advantage of the present invention to provide a method for designing compact, efficient waveguide mode control and conversion devices useable in microwave and optical applications.

It is a further object and advantage of the present invention to provide a method for designing mode converters, mode filters, waveguide adapters, mode launchers, power splitters, phase shifters and aperiodic gratings for use as couplers in waveguides.

It is a further object and advantage of the present invention to provide a methodology for creating aperiodic mode control and mode conversion surfaces which are more compact than conventional periodic structures used for these purposes.

Yet another object and advantage of the present invention is to provide a method for the design of narrowband filters, specifically for optical applications.

These and many other objects and advantages of the present invention will become apparent to those of ordinary skill in the art from a consideration of the drawings and ensuing description of the invention.

Figure 21A:
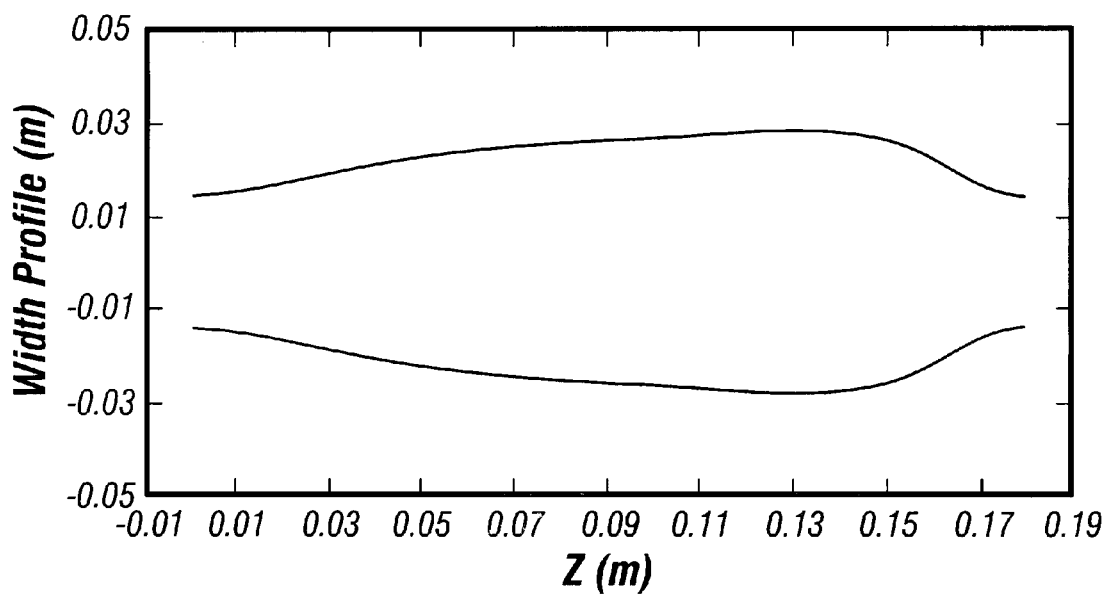
FIG. 21A is a plot of width profile versus distance along the z direction for a prior art circular waveguide $TE_{02}$ to $TE_{01}$ mode converter in accordance with M. J. Buckley, et al., "A Single Period $TE_{02}$ to $TE_{01}$ mode converter in a highly overmoded circular waveguide,"*I.E.E.E. Transac-* tions on Microwave Theory and Techniques, Vol. 39, No. 8 (August 1991), pp. 1301–1306.
Figure 21B:
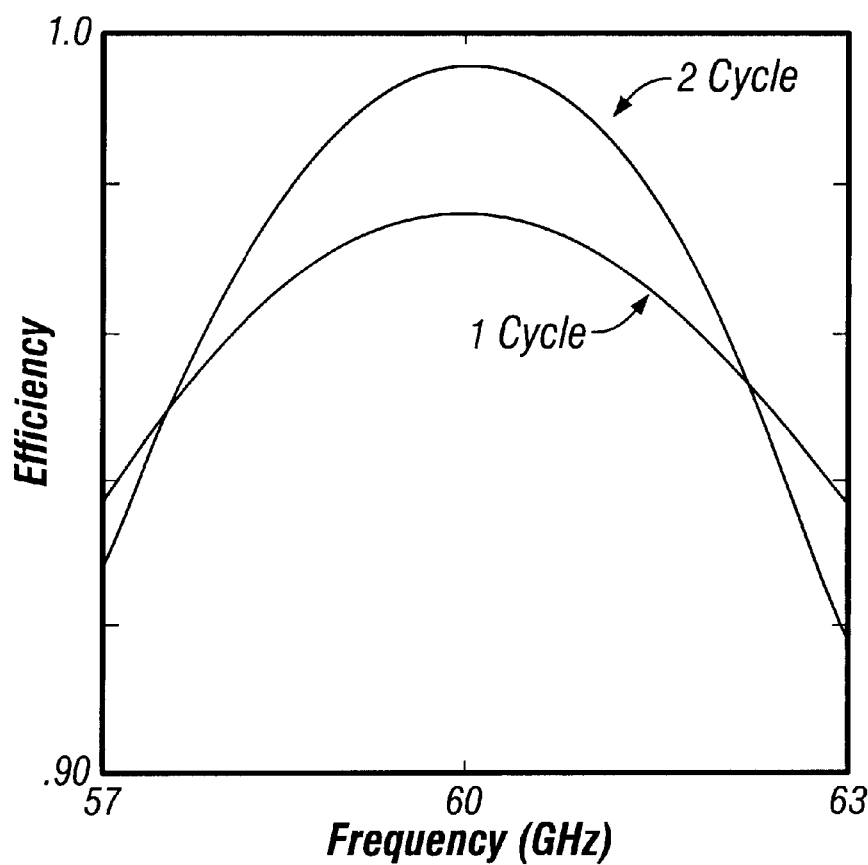

FIG. 21B is a plot of efficiency versus frequency (GHz) for a prior art circular waveguide $TE_{02}$ to $TE_{01}$ mode converter in accordance with M. J. Buckley, et al., "A Single Period $TE_{02}$ to $TE_{01}$ mode converter in a highly overmoded circular waveguide," I.E.E.E. Transactions on Microwave Theory and Techniques, Vol. 39, No. 8 (August 1991), pp. 1301–1306.

Figure 19:
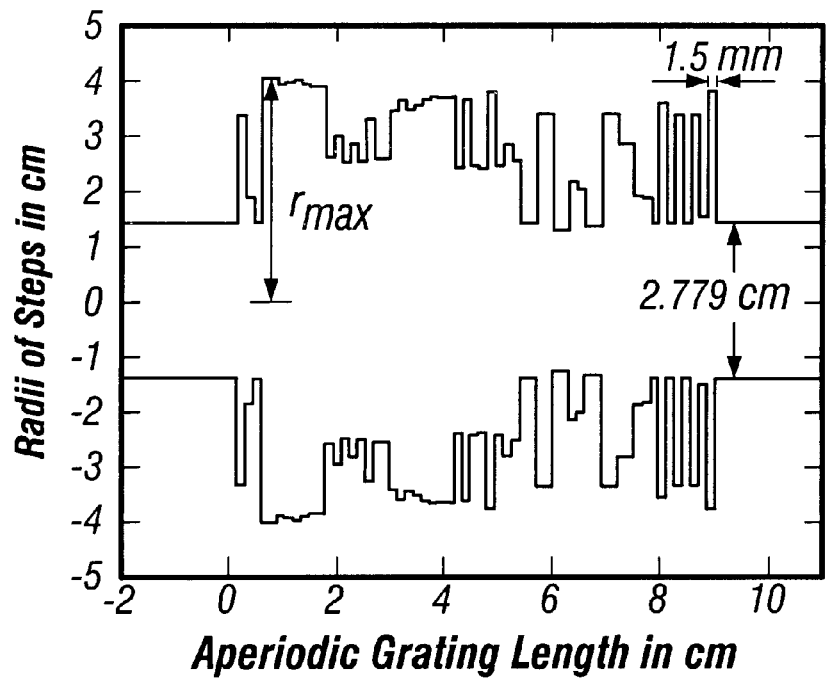
FIG. 19 is a diagram showing the structure of a $TE_{02}$ to $TE_{01}$ mode converter structure for circular waveguide in accordance with a presently preferred embodiment of the present invention.
Figure 20:
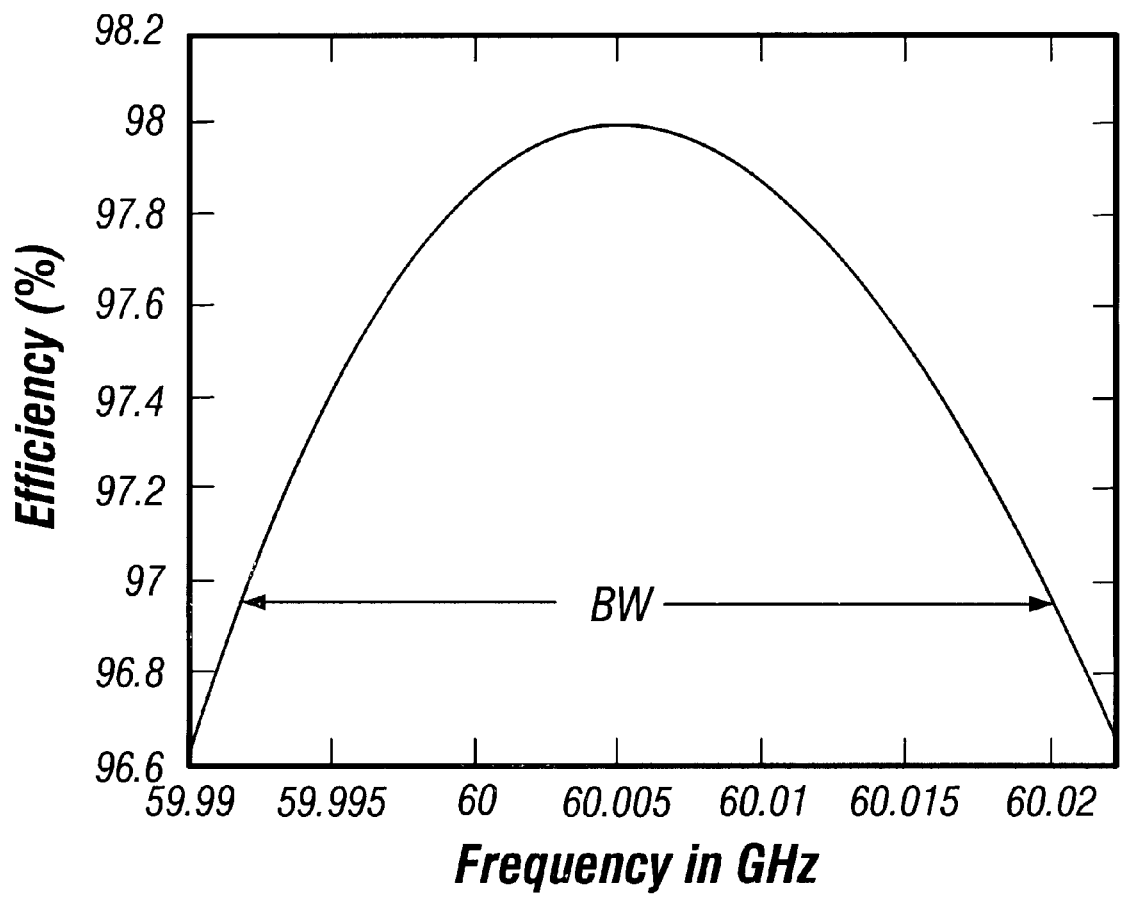
FIG. 20 is a plot of efficiency versus frequency for the $TE_{02}$ to $TE_{01}$ mode converter structure of FIG. 19.
Figures 22, 23:
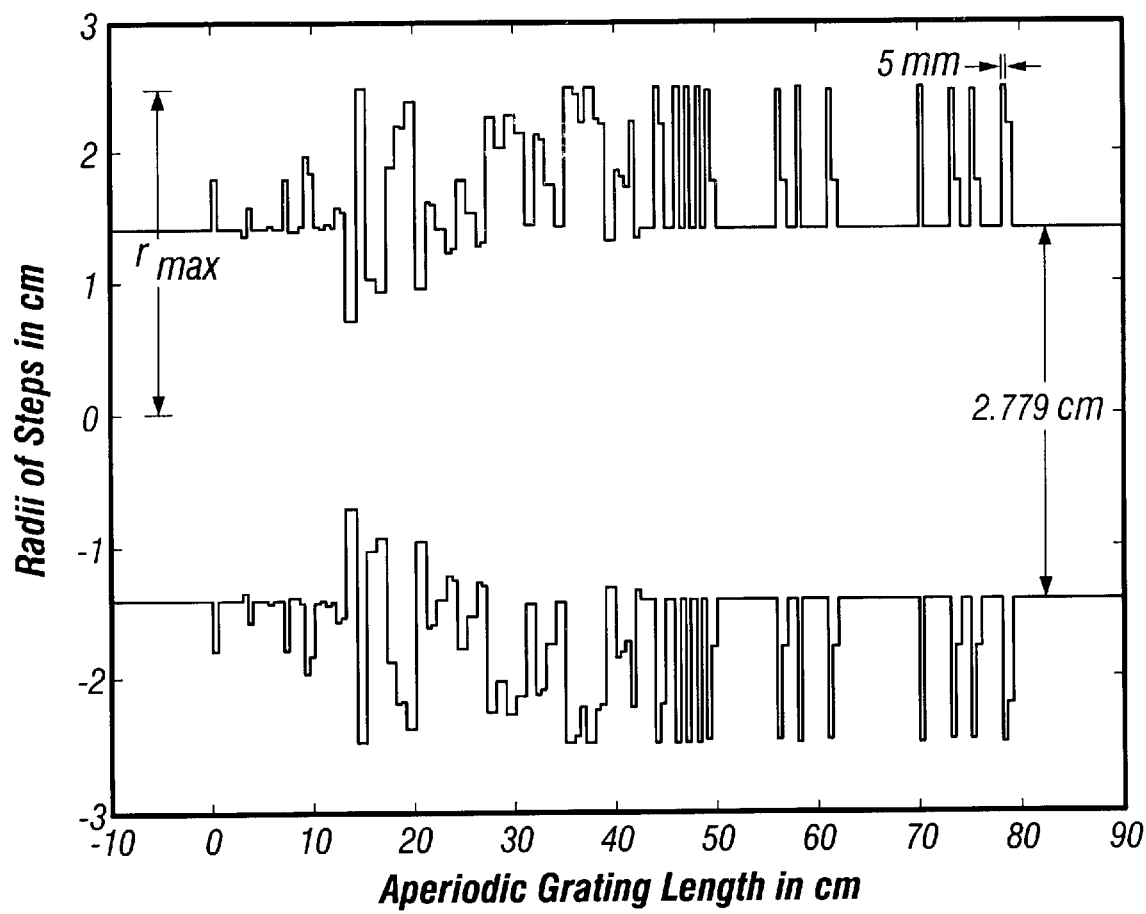

FIG. 22 is a chart comparing the length and conversion efficiency of the "Previous" design of FIGS. 21A and 21B with the "Present" design of FIGS. 19 and 20.

FIG. 23 is a diagram of a grating design for a circular waveguide $TE_{06}$ to $TE_{01}$ mode converter for operation at 140 GHz in accordance with a presently preferred embodiment of the present invention.

Figures 24, 25:
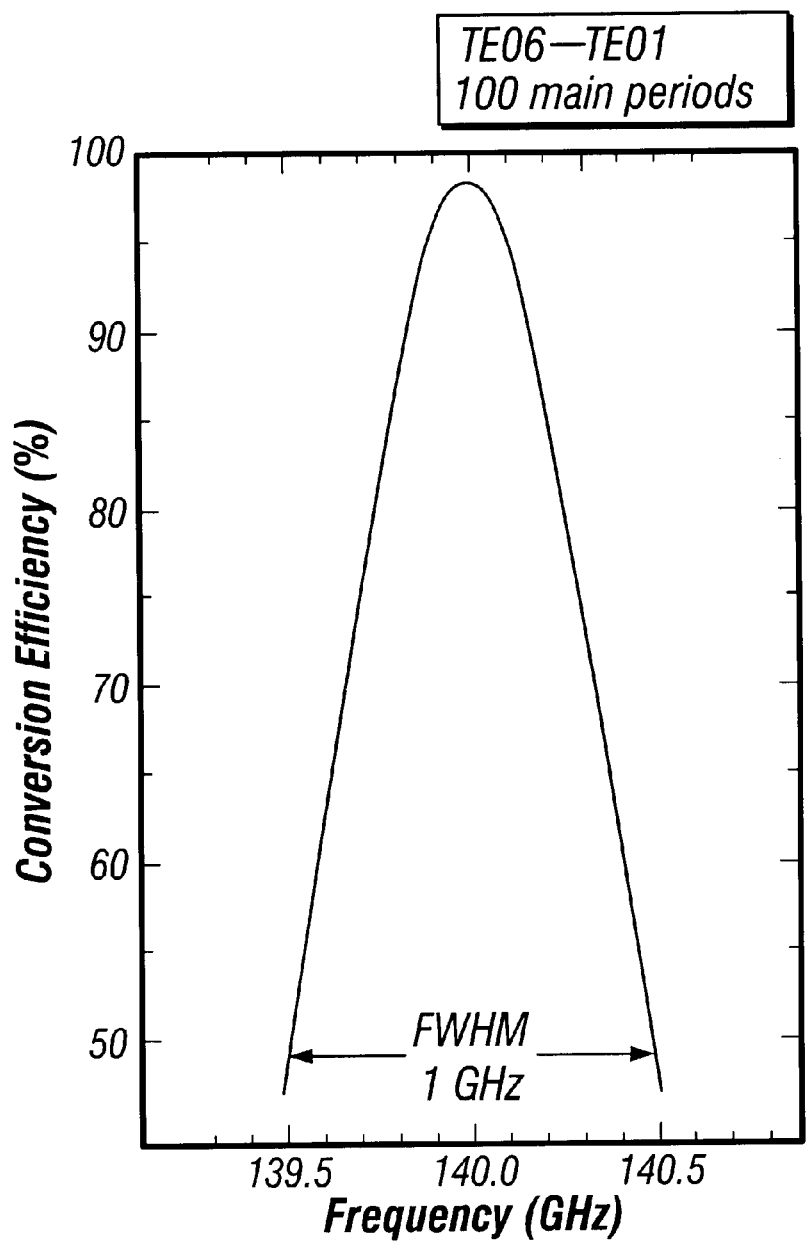

FIG. 24 is a plot of efficiency versus frequency (GHz) for a prior art circular waveguide $TE_{06}$ to $TE_{01}$ mode converter for operation at 140 GHz in accordance with K. Kumric, et al., "Optimization of Mode Converters for Generating the Fundamental $TE_{01}$ Mode from $TE_{06}$ Gyrotron Output at 140 GHz," International Journal of Electronics, Vol. 64, No. 1 (January 1988), pp. 77–94.

FIG. 25 is a chart comparing the length and conversion efficiency of the "Previous" design of FIG. 24 with the "Present" design of FIG. 23.

Figure 26:
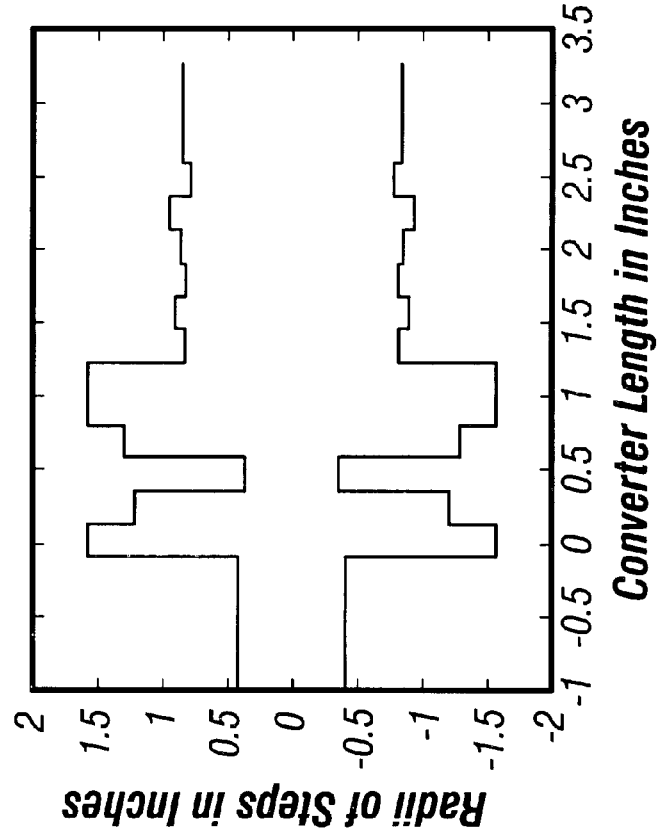
Figure 26:
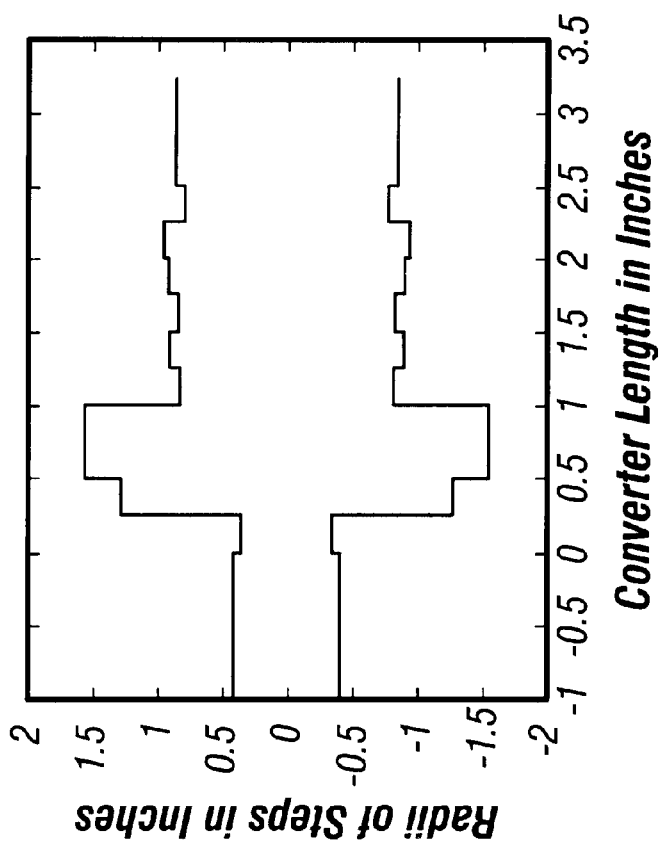

FIG. 26 is a pair of diagrams comparing a pair of designs for a circular waveguide $TE_{11}$ to $TM_{11}$ mode converter structure each designed in accordance with a presently preferred embodiment of the present invention.

FIG. 27 is a chart comparing the length and conversion efficiency and other performance parameters of the "Design 1" design of FIG. 26 with the "Design 2" design of FIG. 26.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

The present invention is directed to a new method for the design and fabrication of mode control devices which can result in aperiodic, totally rough structures. These devices can be developed for free space wave propagation or for microwave and optical waveguides. Previously it was believed that there are only certain type of shapes (mostly periodic structures) that can be used to develop mode control devices. In accordance with the method set forth below, however, the domain of all possible shapes and materials is explored for a scattering obstruction, which when placed in the path of the incoming electromagnetic wave will convert power from a set of modes in the incoming electromagnetic wave (one or more) to any of a set of modes at the output. The method taught here is completely general and does not restrict itself to a specific type of pattern variation. Structures obtained with this method have aperiodic variations and can be very irregular in shape. These structures are generally very short as compared to their periodic counterparts obtained using coupled mode theory.

Overview

The basic concept is to place an obstruction in the path of the incoming electromagnetic field. The shape, size, and material of the obstruction is totally arbitrary. When the incoming field interacts with the obstruction, it scatters into various modes of propagation. A procedure is then adopted to optimize the shape, size, and material of the obstruction so as to maximize the power scattered into the required mode at the output, so that close to 100% of the input power is transformed into the desired mode or that the output mode(s) has the desired characteristic. The size and shape of the input and output waveguides is arbitrary. Also the obstruction can protrude outside the dimension of the waveguide and the waveguide wall dimensions can vary in the mode converter section.

Methodology

The variation in the shape of the waveguide and/or material of the obstruction, in each of the three dimensions (the three dimensions for rectangular and parallel plate waveguides are the Cartesian coordinates: x, y and z; for circular waveguides, these are the cylindrical coordinates: r, φ and z), can be represented by suitably weighting a set of basis functions, e.g., delta functions, step functions, trigonometric functions, Bessel functions and other functions as would be readily understood by those of ordinary skill in the art.

Figure 2:
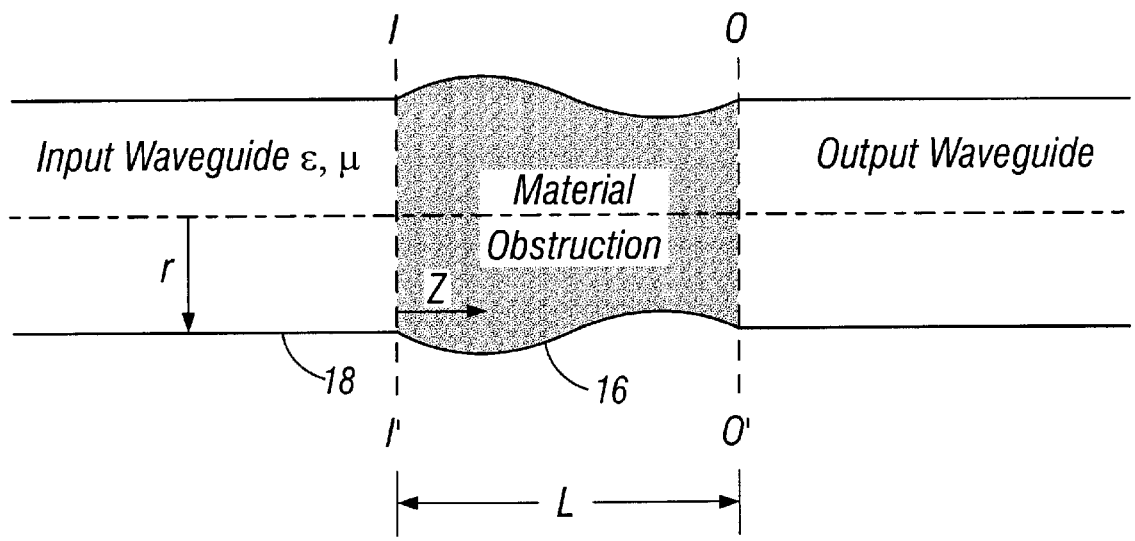
FIG. 2 is a schematic diagram of an input waveguide section, a mode conversion/control element and an output waveguide section in accordance with a presently preferred embodiment of the present invention.
Figure 3:
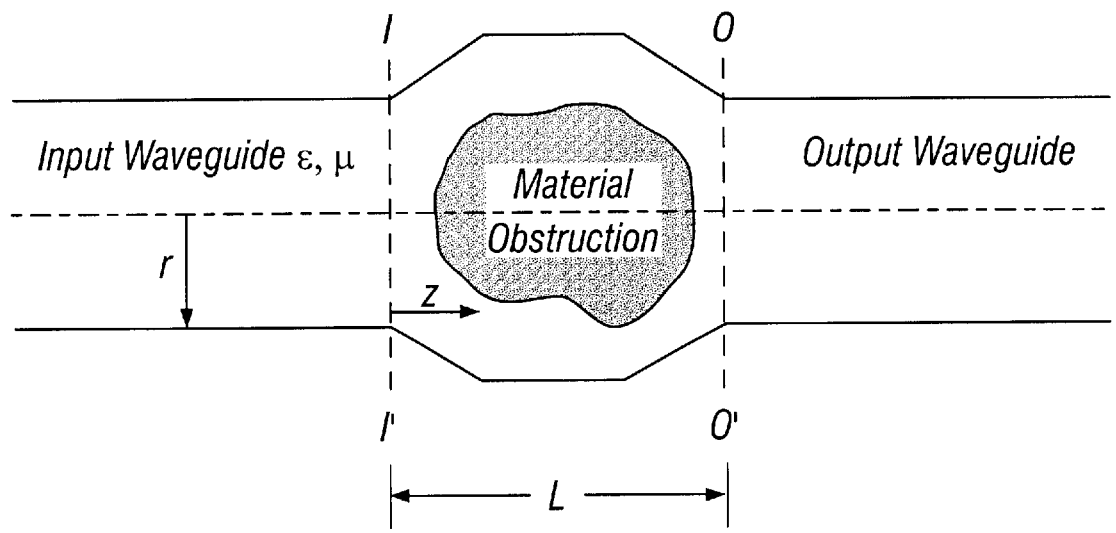
FIG. 3 is a schematic diagram of an input waveguide section, a mode conversion/control element and an output waveguide section in accordance with a presently preferred embodiment of the present invention.

To illustrate the idea consider an obstruction placed in a circular waveguide. In the most general case, both the shape of the waveguide and material properties of the obstruction will be changed in all directions as shown in FIG. 3. However, to keep it simple assume that the shape and material properties of the obstruction do not vary in the radial, r, and circular, φ, dimensions as in FIG. 2. This means that the obstruction 16 fills the whole waveguide 18 and its dimension and material properties vary only as a function of z (the distance along the waveguide in the direction travelled by the incoming electromagnetic wavefront). Such a structure would be able to convert only the radial suffix of the incoming mode. Specifically, the following conversions are possible:

$TE_{mn}$ to $TE_{mp}$
$TE_{mn}$ to $TM_{mp}$
$TM_{mn}$ to $TE_{mp}$
$TM_{mn}$ to $TM_{mp}$

Before the design procedure starts it is necessary to specify the composition of the input electromagnetic field and the output electromagnetic field. It is also necessary to specify some parameters of the output magnetic field which are to be optimized to obtain the required output. In the present case, the input is a combination of $TE_{mn}$ modes while output is a $TE_{mp}$ mode. The optimization parameter is thus the power in mode $TE_{mp}$.

The z-variations in the shape and electrical/magnetic material properties of the obstruction can be represented by using some suitable basis functions. Some examples are given below:

Using the Waveguide Shape $\Delta r(z) = r_0 \delta(z) + r_1 \delta(z-z_1) + r_2 \delta(z-z_2) + \ldots$ (δ is the Kronecker delta function)

OR $\Delta r(z) = r_0 U(z) + r_1 U(z-z_1) + r_2 U(z-z_2) + \ldots$ (U is the step function)

OR $\Delta r(z) = r_0 \sin(z) + r_1 \sin(3z) + r_2 \sin(5z) + \ldots$

OR $\Delta r(z) = r_0 J_0(z) + r_1 J_1(z) + r_2 J_2(z) + \ldots$ ($J_N$ are the Bessel functions)

where 0<z<L; L is the maximum length of the obstruction.

If r is the radius of the input waveguide then $\Delta r(z)$ is the delta change in waveguide radius as a function of z.

Lower Limit on $\Delta r(z)$: $\Delta r(z) > -r$

Upper Limit on $\Delta r(z)$: Practical constraint on the largest radial dimension for the waveguide.

Using the Electrical Properties of the Obstruction (Dielectric Constant, $\in$)

$$\Delta\in(z)=e_0\delta(z)+e_1\delta(z-t_i)+e_2\delta(z-t_2)+\ldots \text{ ($\delta$ is the Kronecker delta function)}$$

OR $$\Delta\in(z)=e_0U(z)+e_1U(z-t_1)+e_2U(z-t_2)+\ldots \text{ ($U$ is the step function)}$$

OR $$e_0\sin(z)+e_1\sin(3z)+e_2\sin(5z)+\ldots+.$$

OR $$\Delta\in(z)=e_0J_0(z)+e_1J_1(z)+e_2J_2(z)+ \text{ ($J_N$ are the Bessel functions)}$$

where $0<z<L$; L is the maximum length of the obstruction.

If $\in$ is the dielectric constant of the material in the input waveguide then $\Delta\in(z)$ is the delta change in $\in$ as a function of z.

Using the Magnetic Properties of the Obstruction (Magnetic Permeability, $\mu$)

$$\Delta\mu(z)=u_0\delta(z)+u_1\delta(z-d_1)+u_2\delta(z-d_2)+\ldots \text{ ($\delta$ is the Kronecker delta function)}$$

OR $$\Delta\mu(z)=u_0U(z)+u_1U(z-d_1)+u_2U(z-d_2)+\ldots \text{ ($U$ is the step function)}$$

OR $$\Delta\mu(z)=u_0\sin(z)+u_1\sin(3z)+u_2\sin(5z)+\ldots$$

OR $$\Delta\mu(z)=u_0J_0(z)+u_2J_2(z)+u_2J_2(z)+\ldots \text{ ($J_N$ are the Bessel functions)}$$

where $0<z<L$; L is the maximum length of the obstruction.

If $\mu$ is the magnetic permeability of the material in the input waveguide then $\Delta\mu(z)$ is the delta change in $\mu$ as a function of z.

Note that for delta functions if the difference between two consecutive $z_n$'s is negligibly small and the difference between two consecutive $\Delta r(z)$ values is much less than a wavelength, then the above representation can be used to model continuous surfaces, which is the most general case. For step functions the same can be done by restricting the difference between two consecutive $\Delta r(z)$ and two consecutive $z_n$'s to be much less than a wavelength. The other two functions mentioned above automatically result in continuous surfaces.

If one type of function is used for the waveguide shape, it is not necessary that the same type of function be used for material properties. The functional representation of $\Delta r(z)$, $\Delta\in(z)$, and $\Delta\mu(z)$ can be totally different.

The variables $r_0, r_1, r_2, \ldots; e_0, e_1, e_2, e_3, \ldots; u_0, u_1, u_2, u_3, \ldots; z_1, z_2, z_3, \ldots, t_1, t_2, t_3, \ldots, d_1, d_2, d3, \ldots$ for step, delta, sine, Bessel or other functions; and length L uniquely represent the shape and material of the obstruction. The power scattered by this structure in a particular mode, $P_0$, at the output of the structure is then a function of all these variables, i.e., $$P_0=P_0(r_0, r_1, r_2, \ldots; e_0, e_1, e_2, e_3, \ldots; u_0, u_1, u_2, u_3, \ldots; z_1, z_2, z_3, \ldots, \text{etc.}, L)$$

In accordance with the design methodology of the present invention, one optimizes the power $P_0$ as a function of these variables so that nearly 100% of the input power is, for example, converted to the required mode. Optimized values of the variables then represent the required design of the mode control device.

It may be noted here that there is a potentially infinite number of variables involved in representing the obstruction in the most general case. To make the solution practically viable it is preferable to truncate each infinite series of basis functions to a finite number of terms. Thus, one can express $P_0$ as:

$$P_0(r_0, r_1, r_2, \ldots, r_n, e_0, e_1, e_2, e_3, \ldots, e_m, u_0, u_2, u_3, \ldots, u_q, L)$$

where the series for $\Delta r(z)$ is truncated to n+1 terms, for $\Delta\in(z)$ it is m+1 terms, and $\Delta\mu(z)$ is q+1 terms.

Even after truncation, the number of variables for optimization may be very large. To optimize say 50 variables simultaneously is often a very difficult problem. Most global optimization techniques work best when the number of variables is limited to between two and five variables. In order to optimize the mode converter a hierarchical, sectional optimization procedure has been developed.

Hierarchical Optimization

In this procedure one starts with a very coarse estimate for the features of the mode converter. This is done by just a few terms in the basis function representation of shape/material and a small length L. This way the initial number of variables is small. These variables are then optimized in order to obtain a coarse estimate of the final structure. Next, more terms are added to the series and L is also increased, thus increasing the number of variables and also refining the representation of the mode transducing obstruction. Optimization is again carried out and the procedure is repeated until a suitable mode converter is identified. Because of a small number of variables in earlier stages a lot of computation time is saved.

Sectional Optimization

As one moves up in the hierarchical optimization procedure the task of optimization becomes even more difficult due to the increase in the number of variables. In order to perform a global optimization of all of these variables a sectional optimization procedure is preferably employed. For example, assume that one is using a global optimization technique which converges best when the number of variables is restricted to two, but the number of variables to be optimized is 50. The variables may then be optimized two at a time, starting with the first two. While optimizing a set of two the rest of the variables are kept constant. When all the 50 variables have been optimized once, go back to the first set and repeat the sequence. The sectional optimization sequence is continued until a global solution is achieved for all the 50 variables.

It may be observed that as one truncates the series to a small number of terms, at the start of hierarchical optimization, one restricts the domain of the structures that can be formulated for mode conversion. During optimization one searches in this restricted domain of structures. If a desired solution is obtained, the process is halted and the solution is accepted, otherwise the number of terms in the series is increased and/or the length, L, is increased and a search is carried out in a larger domain of possible structures. This procedure is continued until an appropriate structure is identified. Thus no presumption is made about the final shape of the mode converter.

The hierarchical procedure defined above does not result in unique solutions for mode conversion structures because the number of free variables is much greater than the cost function constraints. Depending upon the initial guess for optimization, type of basis functions, and number of terms in the series various solutions can be obtained for the same problem. Out of the various solutions found through the design process only those structures may be considered that are feasible to fabricate using the available fabrication procedures. Normally a number of solutions would be obtained. Each would be assessed for its feasibility of construction and the easiest to fabricate would be chosen for development.

Design of Mode Control Devices Using Arbitrary Structure Optimization

1. Specify the Application of the Device

At this point one must determine and specify the basic known parameters of the device to be designed. This requires the following to be determined:

(a) Frequency of operation, type, structure, and size of the input and output waveguides. (Microwave and lower/upper frequencies: free space, parallel plate, rectangular, circular, elliptical, etc. waveguides, and transmission lines like microstrip, stripline, coaxial etc. Optical and lower/upper frequencies: free space, slab, fiber etc. waveguides);

(b) Mode composition of the incident electromagnetic field;

(c) Required mode composition and characteristics of the output electromagnetic field; and (d) Parameters of the output electromagnetic field which uniquely specify the field and are to be optimized.

2. Pick a Method of Variation

Pick any of the following methods for generating a wave obstructing structure:

(a) Variation of waveguide shape only;

(b) Variation of only the material properties of the obstruction; and (c) Variation of both the shape and the material.

Which of the above three methods one chooses depends upon the suitability of fabrication for a particular application and waveguide type. Methods 2a, 2b and 2c may be used for both microwave waveguides and optical waveguides. For free space application there can be two cases: reflection and transmission. In the reflection case the obstruction would be a rough aperiodic reflecting surface; in the transmission case a dielectric obstruction with varying shape and properties can be used.

3. Choose the Material

Choose the material to be used for the obstruction. If method 2a is used then the material would preferably be the same as that used for the input waveguide.

4. Decide the Directions of Perturbation

Depending upon the input mode structure and the required output mode, decide the directions in which the obstruction and/or waveguide shape and material must vary. For example for a $TE_{mn}$ mode, in a rectangular waveguide, the following conversions can be achieved:

| | |
|---|---|
| $TE_{mn}$ to $TE_{mp}$ | by varying the structure in y dimension. |
| $TE_{mn}$ to $TE_{pn}$ | by varying the structure in x dimension. | where the "m" subscript refers to the x-direction and the "n" subscript refers to the y-direction.

5. Pick a Suitable Basis Function

Pick a basis function to represent the waveguide shape and/or material properties in each of the waveguide dimensions. Again, the selection of the basis functions would depend upon the particular application and fabrication procedure, e.g., sinusoidal basis functions may be more suitable when the mode converter is going to be pre-formed or molded. By selecting step functions for a circular microwave waveguide, a very easy fabrication technique may be implemented as shown below. Truncate the infinite series representation to a finite number of terms.

6. Choose an Initial Structure Approximation

Give some arbitrary (but realistic) values to all the variables (coefficients) in the series representations. Also pick a length, L, for the structure. Initially choosing these values defines an initial "guess" for the shape and material of the obstruction. This guess will act as the initial point for the optimization procedure. After some experience in dealing with a specific application a designer can use his/her intuitive feeling as to what type of initial guess would result in faster convergence of optimization and best results. See the discussion of initial structure approximation, below.

7. Formulate the Forward Solution

Figure 1:
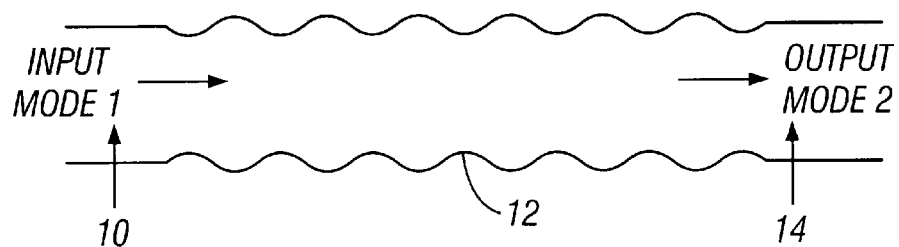
FIG. 1 is a schematic diagram of a conventional periodic grating used in mode control and conversion in accordance with the prior art.

Given the information in steps 1 through 5, the forward solution to the scattering problem can be formulated. The goal is to find the electromagnetic field at the exit plane of the obstruction (O–O' in FIG. 1) when a given field is incident on the input plane (I–I' in FIG. 1). Any boundary value solution technique can be used to solve for the output field. A very useful commercial software package for this purpose is HFSS (High Frequency Structure Simulator) available from the Hewlett-Packard Corporation of Cupertino, Calif. Other software packages are also available to perform functions like this as is well known to those of ordinary skill in the art. From the solution of the electromagnetic field, the power coupled into the required output mode(s), $P_0$, in the output waveguide can be evaluated. $P_0$ is a function of all the defining variables for the obstruction and needs to be optimized (maximized) to find the required structure.

8. Perform a Global Optimization

Select a global optimization technique for constrained optimization. It is preferable to use constrained optimization because most of the time there would be realistic constraints on the minimum and maximum values of various variables (coefficients). For example, the radius of a circular waveguide can't be less than or equal to zero. Similarly there are limits to which $\epsilon$ can be realistically varied for a dielectric. Routines for constrained optimization are available in standard C and Fortran libraries, and also in software packages like MATLAB available from The Mathworks, Inc. of Natick, Mass. Most of these routines work best when the number of optimization variables is small, say 2. Use the hierarchical, sectional optimization procedure explained in the previous section to optimize $P_0$ as a function of the properties of the obstructing structure. As optimization is continued the number of variables may be increased to more finely define the obstruction, thus achieving more flexibility in optimization and reaching a desired value of $P_0$ as a percentage of the total input power.

If there is more than one parameter that specifies the output field, e.g., powers and phases of more than one mode, then the optimization becomes even more difficult. For example, consider the case where the output electromagnetic field has two modes with equal power in each. Then we can maximize the following two parameters:

1. $P_0$, the total additive power in the two modes, i.e., $P_0 = P_1 + P_2$, where $P_1$ and $P_2$ are the powers in the two modes respectively.

2. $R = P_{small}/P_{large}$, where $P_{small}$ is the smaller of the two values $P_1$ and $P_2$ and $P_{large}$ is the larger of the two values.

Thus when carrying out the design of a specific mode control/conversion element, the additional items (for example) would need to be specified:

Output Field: 50% $TE_{11}$ and 50% $TM_{11}$

Optimize: $P_0$=Total output power in $TE_{11}(P_1)$ and $TM_{11}(P_2)$ modes. $P_{small}$ is the smaller of the two mode powers $P_1$ and $P_2$ and $P_{large}$ is the larger of the two mode powers.

Optimize: $R=P_{small}/P_{large}$

9. Obtain Multiple Designs (Optional)

This step is optional but preferred. Repeat steps 5 through 8 to come up with a number of different designs based upon different initial starting points for the structures (step 6). Select one of these designs to build the mode control/conversion device based on simplicity of structure, bandwidth of operation, size, ease of fabrication, and the ability of the design to tolerate fabrication errors (maximum possible in the fabrication technique) without drastically affecting the Value of $P_0$.

10. Fabricate the Device

Fabricate the mode control device using an appropriate fabrication technique.

DESIGN EXAMPLES

What follows are examples which demonstrate the techniques used to design different types of mode control/conversion devices (in different waveguide geometries) using the methods of the present invention. The following descriptions are based upon the same basic steps described in the previous section.

Example 1

$TE_{mn}$ to $TE_{pq}$ Mode Converter in a Rectangular Waveguide Using Only Material Variation 1. Specify the Application of the Device
   (a) Frequency: 4 GHz
       Input Waveguide: Dielectric filled ($\in$) metallic wall rectangular waveguide with dimensions "a" in the x-direction and "b" in the y-direction.
       Output Waveguide: Same waveguide as at the input.
   (b) Input EM Field: A known combination of $TE_{mn}$ modes.
   (c) Output EM Field: Only $TE_{pq}$ mode.
   (d) Output Parameter: Power in $TE_{pq}$ mode.

2. Pick a Method of Variation

Figure 4:
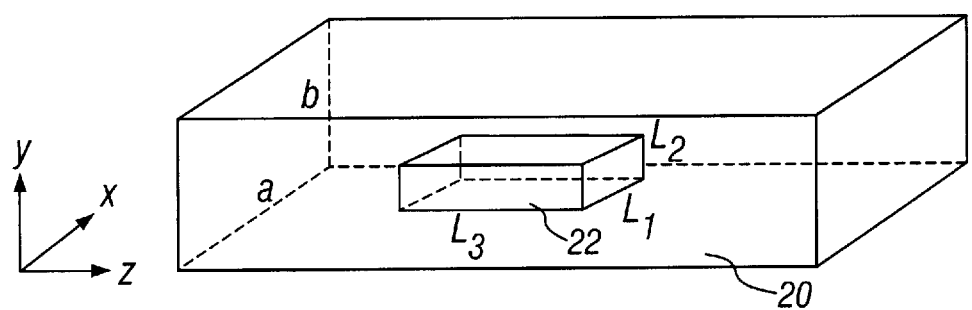
FIG. 4 is a schematic diagram of a mode conversion/control element disposed within a waveguide section in accordance with a presently preferred embodiment of the present invention.

Here it is desired to develop the mode converter by putting a dielectric material inside the waveguide 20 at box 22 as shown in FIG. 4. Thus, the method of variation in the material properties of the obstruction is selected and the waveguide dimensions remain constant. As the obstructing device 22 is a dielectric material, its magnetic permeability, $\mu$, is also assumed to be constant.

3. Choose the Material

Choose a suitable material for the structure. The material should be such that its $\in$ can be varied significantly and various shapes can be fabricated easily using this material. A wide variety of such materials are known to those of ordinary skill in the art. Examples include: teflon and ceramic.

4. Decide the Direction of Perturbation

Because it is desired to convert from $TE_{mn}$ modes to a $TE_{pq}$ mode, i.e., both suffixes need to be converted. $\in$ will thus be allowed to vary in all the three dimensions x, y, and z.

5. Pick a Suitable Basis Function

The variation in $\in$ is represented by using sinusoidal basis functions such that:

$$\Delta\in(x,y,z)=x_0 \sin(x)+x_1 \sin(3x)+\ldots+y_0 \sin(y)+y_1 \sin(3y)+\ldots+z_0 \sin(z)+z_1 \sin(3z)+\ldots$$

The series is truncated to two terms in each dimension, yielding:

$$\Delta\in(x,y,z)=x_0 \sin(x)+x_1 \sin(3x)+y_0 \sin(y)+y_1 \sin(3y)+z_0\sin(z)+z_1 \sin(3z)$$

6. Choose an Initial Structure Approximation

Assign suitable values to $x_0$, $x_1$, $y_0$, $y_1$, $z_0$, $z_1$ and also chose lengths $L_1$, $L_2$, and $L_3$.

7. Formulate the Forward Solution

The forward solution is developed by writing a FEM (Finite Element Code) or by using HFSS software to find power $P_0$ in the mode $TE_{pq}$. Then $P_0=P_0(x_0, x_1, y_0, y_1, z_0, z_1, L_1, L_2, L_3)$ 8. Perform a Global Optimization BCPOL, an IMSL (International Mathematical and Statistical Library) constrained optimization routine is preferably used for optimizing $P_0$. Variables $x_0$, $x_1$, $y_0$, $y_1$, $z_0$, $z_1$, $L_1$, $L_2$ and $L_3$ are optimized using the hierarchical, sectional optimization procedure explained in the previous section. The optimized variables then define the structure of the dielectric obstruction for mode conversion. BCPOL is available from IMSL of 2500 City West Blvd., Houston, Tex.

9. Obtain Multiple Designs (Optional)

Optionally repeat steps 5 through 8 to generate a variety of designs based upon different sets of initial values for the variables: $x_0$, $x_1$, $y_0$, $y_1$, $z_0$, $z_1$, $L_1$, $L_2$ and $L_3$. Select the best design based on performance and ease of fabrication.

10. Fabrication

Fabricate the final design using an appropriate technique.

Example 2

Free Space Optical Wavelength Filter: Bragg Reflector

This example provides a methodology for preparing mode control/conversion devices for use in optical waveguide systems, e.g., optical fiber. In order to be able to more fully utilize the available optical fiber spectrum for communication of data, wavelength division multiplexing of the signal can be used. The limitation of the system becomes how close the lines can be spaced. The LASER line needs to be of very narrow bandwidth and stable in order for close spacing. In addition, narrow spectral linewidth (and hence long coherence length) light is important for metrology.

Conventional periodic Bragg reflectors cannot produce as narrow a passband as aperiodic structures of the same total thickness. Rather than relying on end mirrors, the spectral and mode control structure could be distributed throughout a LASER diode cavity. Using lithography or special semiconductor material growth procedures known to those of ordinary skill in the art, it is possible to have materials with different refractive index properties distributed throughout the LASER cavity. By controlling the size and location of these materials, it is possible to also control the optical signal properties of the cavity in a superior fashion to the standard cavity approach. The location and size of the "inhomogeneities" that are distributed throughout the cavity would be optimized to achieve the desired result.

In a wavelength division multiplexing system, filters for multiple wavelengths are needed where several wavelengths are passed and the remainder of the spectrum is rejected. Standard filter theory can be used to design a bandpass filter for a single wavelength. If there are, for example, three wavelengths, then superimposing or cascading designs for each wavelength will not work very well because a filter for one wavelength will not pass the other two effectively. By using optimization techniques with aperiodic structures, better filters for the three wavelengths can be designed. These filters are implemented by changing the dielectric properties or profile of an optical waveguide (e.g., planar or optical fiber).

Here, the goal is to design a narrow band filter for optical wavelengths to be used in narrow band distributer Bragg reflector ("DBR") or distributed feedback ("DFB") LASERs. Currently periodic dielectric variations, i.e., gratings or Bragg reflectors, are used in DBR LASERs to make them narrow band. In accordance with the technique of the present invention, these are replaced with irregular structures the shapes of which are not pre-defined. These structures generally achieve narrower bandwidth of operation than can be achieved by Bragg reflectors. Thus in this way the present invention can be used to design narrow wavelength filters for optical applications.

Figure 5:
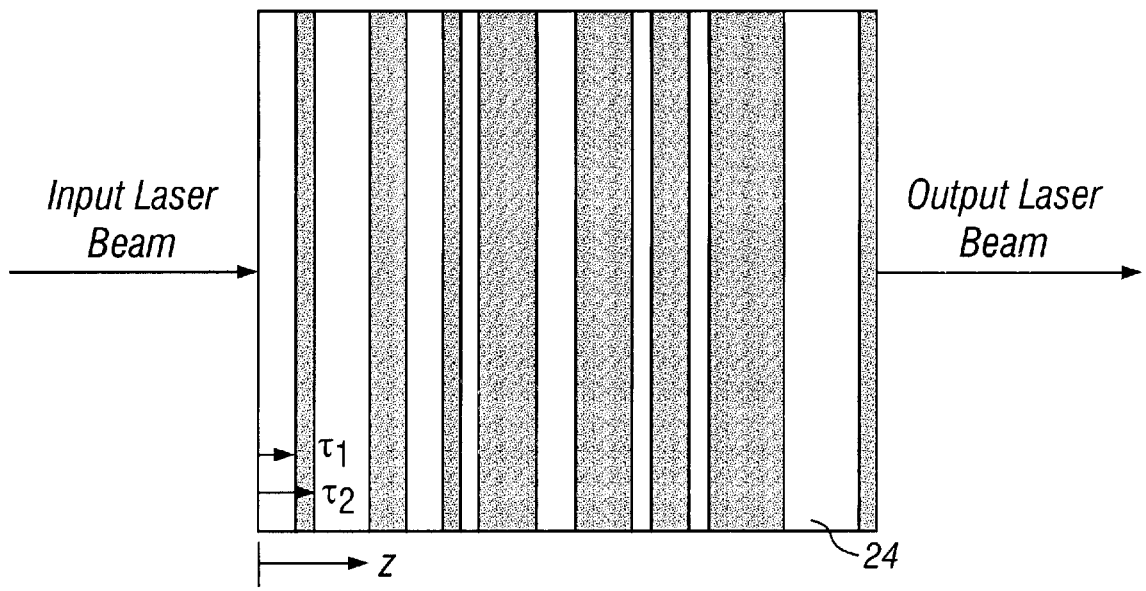
FIG. 5 is a schematic diagram of a mode conversion/control element formed of slabs of materials of varying indices of refraction disposed in an optical structure in accordance with a presently preferred embodiment of the present invention.

1. Specify the Application of the Device
   (a) Frequency: Optical LASER Frequency (Wavelength= 1480 nm)
   (b) Input EM Field: Normally incident single plane wave in free space (say output of a LASER).
   (c) Output EM Field: Normally exiting single plane wave in free space.
   (d) Output Parameter: Power in the output wave.
2. Pick a Method of Variation
   For obvious reasons choose method 2b: Variation of material properties of the obstruction.
3. Choose the Material
   The scattering structure will consist of a thick dielectric slab 24 schematically shown in FIG. 5 whose dielectric constant varies in the z direction only (the direction of the incoming wave). It is preferable to use a material that is easy to use and can have maximum variation of $\in$. $Al_xGa_{1-x}As$ is suited for such an application. Other suitable materials will also be readily apparent to those of ordinary skill in the art. By changing "x" in the chemical formula, a large variation in e can be achieved (8.8 to 12.8). Using an MBE (Molecular Beam Epitaxy) machine it is possible to grow layers of $Al_xGa_{1-x}As$ with varying thicknesses. A structure as shown in FIG. 5 made up of slabs of $Al_xGa_{1-x}As$ which have essentially infinite transverse dimensions in comparison to the spot radius of the input LASER beam is used to implement the filter.
4. Decide the Direction of Perturbation
   The dielectric variation will only be in the z direction.
5. Pick a Suitable Basis Function
   For the type of structure proposed in step 3, an ideally suited basis function is the step function. Thus:

$$\Delta\in(z)=e_0 U(z)+e_1 U(z-t_1)+e_2 U(z-t_2)+\ldots \text{ (U is the step function)}$$

where each of the variables $e_0, e_1, e_2, e_3, \ldots$ can vary from 7.8 to 11.8 and $\Delta\in$ is the difference between the $\in$ of the material and the $\in$ of free space. The only limits on $t_1, t_2, t_3, \ldots$ are as follows:

| | |
|---|---|
| $t_{i+1} - t_i \geq t_{min}$ | for all i |
| $t_{i+1} - t_i \leq t_{max}$ | for all i |

$t_{min}$: Minimum sheet thickness that can be generated by the MBE process. It is equal to approximately one atomic layer.
$t_{max}$: Practically feasible maximum thickness of a slab. It is generally equal to a wavelength at the operating frequency of the LASER.

Truncating the series to a finite solution:

$$P_0=P_0(e_0, e_1, e_2, \ldots, e_m, t_1, t_2, \ldots, t_n, L)$$

6. Choose as Initial Structure Approximation
   As an initial "guess" one may alternately pick values of $e_i$'s to be 7.8 and 11.8, select $t_{i+1}-t_i=0.5$ wavelength for all i's, and pick an initial length, L, of 5 wavelengths.
   The dielectric constants (10 in number) and widths of the slabs (10 in number) are then the finite number of variables which uniquely identify the obstructing structure 24.

Figure 5A:
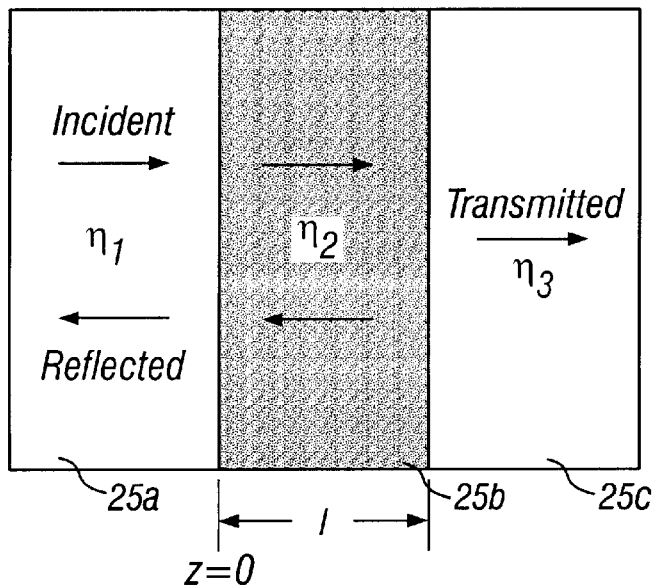
FIG. 5A is a schematic diagram of a mode conversion/control element formed of slabs of materials of varying indices of refraction.

7. Formulate the Forward Solution
   The forward problem is easy to solve. There is a standard analytic expression available to solve for the transmitted power through a series of dielectric slabs.
   The transmitted power for a stack of three dielectrics is calculated as follows. See FIG. 5A. Let $\eta_1, \eta_2, \eta_3$ be the characteristic impedances in the three mediums 25a, 25b and 25c. Then the impedance seen at the input to medium 25b is given as:

$$Z_L=\eta_2((\eta_3 \cos k_2 l + j\eta_2 \sin k_2 l)/(\eta_2 \cos k_2 l + j\eta_3 \sin k_2 l))$$

where $k_2$ is the wave number in medium 25b. Then the reflection coefficient is given as:

$$\rho=((Z_L-\eta_1)/(Z_L+\eta_1))$$

$$P_{transmitted}=P_{incident}(1-|\rho|^2).$$

The output power, $P_0$, at wavelength 1480 nm is then a function of $P_0(e_0, e_1, e_2, \ldots, e_m, t_1, t_2, \ldots, t_n, L)$.

8. Perform a Global Optimization
   The FORTRAN IMSL routine BCPOL is preferably used to globally optimize $P_0$. For this simple problem BCPOL could easily optimize up to 8 variables simultaneously. The constrained optimization limits given in step 5 for various variables are given as input to the BCPOL program. The sectional, hierarchical optimization technique is then used to determine the optimized structure. As optimization progresses, the number of optimization variables is increased for more flexibility by adding more slabs at the beginning or end of the structure, thus increasing L. The process is stopped when almost 100% power is transmitted through the structure at the nominal wavelength.
9. Obtain Multiple Designs (Optional)
   Using different initial guesses and design decisions (as in step 6) a variety of structures are designed. The 3 dB bandwidth for each structure is obtained by solving the forward electromagnetic problem as a function of frequency, i.e., by evaluating the transmitted power at various frequencies and plotting power versus frequency to determine the 3 dB points. The device with the least bandwidth is chosen for fabrication.
10. Fabricate the Device
    The dielectric slab structure is fabricated by growing layers of $Al_xGa_{1-x}As$ by MBE (Molecular Beam Epitaxy) or any other suitable technique.

Example 3

Circular Waveguide $TE_{11}$ to $TM_{11}$ Microwave Mode Converter from Smaller to a Larger Waveguide This structure can be called a mode converter, a mode launcher, or a waveguide transition. It is a mode converter because it converts a $TE_{11}$ mode to a $TM_{11}$ mode. It is a mode launcher because it demonstrates that any type of mode can be launched into an overmoded large waveguide which is fed by a small waveguide having a single known mode in it.

1. Specify the Application of the Device
   (a) Frequency: 9.94 GHz ($\lambda$=3 cm).
      Input Waveguide: Air-filled metallic wall circular waveguide with radius 0.3895".
      Output Waveguide: Air-filled metallic wall circular waveguide with radius 0.812".
   (b) Input EM Field: Only composed of $TE_{11}$ mode.
   (c) Output EM Field: Only composed of $TM_{11}$ mode.
   (d) Output Parameter: Power in $TM_{11}$ mode.
2. Pick a Method of Variation
   Method 2a is selected (variation of waveguide shape) because this is easy to demonstrate and also results in a new way of fabricating microwave waveguide mode converters, as will be discussed later.

3. Choose the Material

To keep it simple, choose an air-filled mode converter section.

4. Decide the Direction of Perturbation

Because both $TE_{11}$ and $TM_{11}$ modes are circularly symmetric, a change in the radial dimension of the waveguide as a function of z would be suitable for such a conversion.

5. Pick a Suitable Basis Function

In order to demonstrate a very inexpensive and modular fabrication technique for microwave mode converters select step functions to represent the delta variation in radius as a function of z. Then:

$$\Delta r(z) = r_0 U(z) + r_1 U(z-z_1) + r_2 U(z-z_2) + \ldots \text{ (U is the step function)}$$

The following restrictions are used on the range of possible values for $r_0, r_1, r_2, \ldots$ and $z_i$'s:

$r_i$'s should be selected so that the radius of the mode converter section at no place is zero or less and is not greater than $r_{max}$ (1.75").

$z_{i+1} - z_i = \Delta s$ where the value of $\Delta s$, the step size, will be a variable in the optimization procedure, i.e., the power $P_0$ in the $TM_{11}$ mode will depend upon the following values:

$$P_0 = P_0(r_0, r_1, r_2, \ldots, r_n, \Delta s, L)$$

where the series has been truncated to n+1 values.

Note that in this formulation positive values of $r_i$'s are permitted, i.e., the structure can protrude outside the walls of the waveguide (see, e.g., FIG. 3). It has been found through experimentation that protrusions outside the waveguide results in quicker convergence of the optimization solution and also results in shorter mode converters. What should be the size of the largest protrusion is a design decision. As the largest protrusion radius, $r_{max}$, is increased, the computation time for the forward solution increases exponentially. In some cases the computation time could be prohibitive to achieve optimization convergence. Also it is desirable to limit the radial size of the mode converter to keep the structure compact.

6. Choose an Initial Structure Approximation

Initially only four terms from the series of step functions are included and use the following values:

$$r_1 = 0.2355", r_2 = 0.25", r_3 = 0.375", r_4 = -0.25",$$

$$\Delta s = 0.2505" \text{ and } L = 1.002"$$

It is desired to fabricate sections of this mode converter out of commonly available 0.2505" thick aluminum sheet. Therefore, the $\Delta s$ are held constant and are not included as a variable in the optimization procedure. This is not required as the $\Delta s$ could be varied as well, if desired.

7. Formulate the Forward Solution

The mode converter structure defined above consists of equally spaced waveguide discontinuities. Given the information in steps 1 through 6 the power in the modes generated by the structure can be calculated using a variety of methods. Two of these methods are Finite Element Method (FEM) and the Mode Matching Method. Hewlett Packard's commercial software HFSS also has the capability to solve for waveguide discontinuities. The power $P_0$ can therefore be written as a function of the various variables, i.e., $$P_0 = P_0(r_0, r_1, r_2, r_3, L)$$

8. Perform a Global Optimization

BCPOL is a gain preferably used for constrained optimization of the variables. Constraints as given in step 5 are used as inputs to the BCPOL algorithm. It was found that the BCPOL solution, in this case, converged faster if the number of variables were restricted to 2. Thus, sectional optimization was employed. To reduce the total time in the calculation of the forward solution, the scattering effect of the whole structure is also calculated in sections. While two of the variables are being optimized, the solution for the other variables is only calculated once and stored in memory. This technique saves a great deal of time, especially when there are a large number of variables.

In the hierarchical optimization procedure, the number of variables can be increased in two ways; by reducing the value of $\Delta s$, or by increasing the overall length of the structure. The technique of reduction in $\Delta s$ can be used until $\Delta s_{min}$ is reached, which is the minimum acceptable thickness of each disc in the structure. $\Delta s_{min}$ is chosen as a fabrication parameter. In this case $\Delta s = \Delta s_{min} = 0.2505"$. Thus, the only option that there is to vary is to increase L (i.e., the number of discs). The value of L is increased gradually during the hierarchical procedure, which increases the domain of possible structures. The procedure is stopped when power in the $TM_{11}$ mode is close to 100%.

9. Obtain Multiple Designs (Optional)

Figure 6:
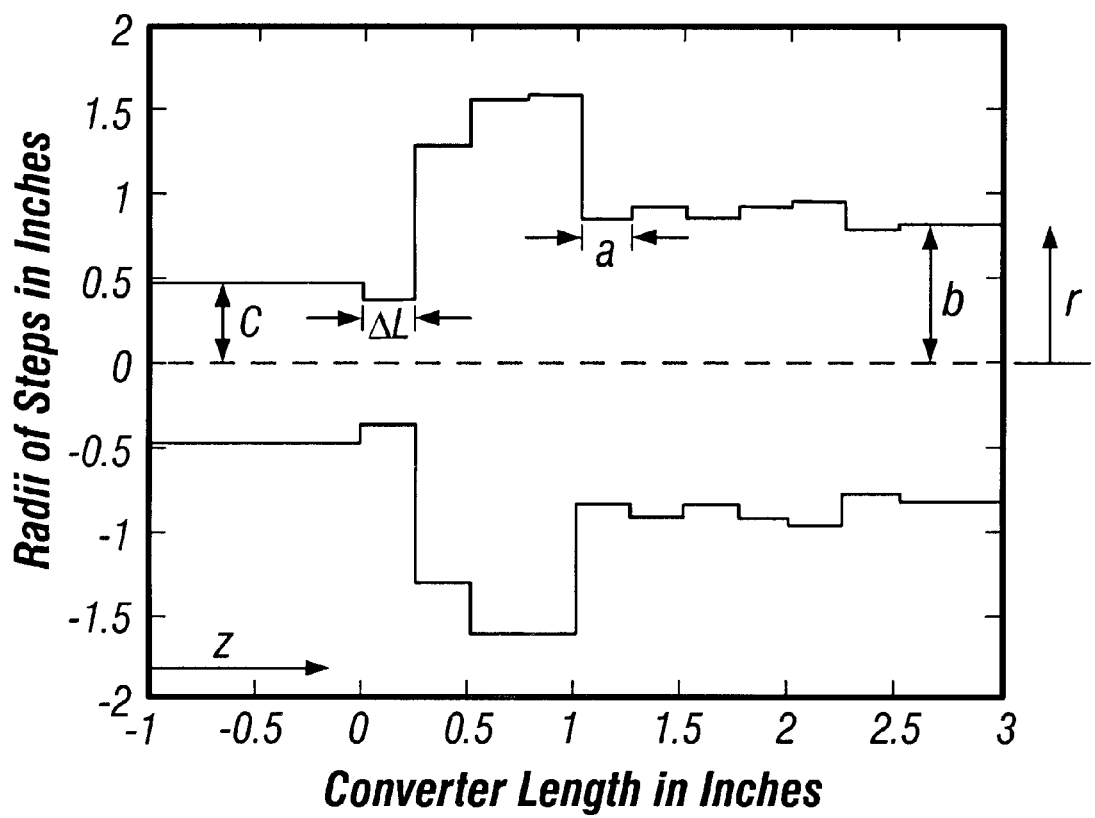
FIG. 6 is a diagram showing the construction of a mode converter in accordance with a presently preferred embodiment of the present invention.

Using different initial guesses and design decisions (as in step 6; when and where to add more steps etc.) various mode converters were designed. The bandwidth of operation was calculated for each design and also estimates were generated as to how much the operation of each was affected by incorporating realistic fabrication errors. Based on these factors the best design was selected for construction. The total length of the finally designed mode converter is 2.505"=10*0.2505" and its conversion efficiency is 99.5%. A cross-sectional view of the $TE_{11}$ to $TM_{11}$ circular waveguide mode converter is shown in FIG. 6.

10. Fabricate the Device

The waveguide mode converter may preferably be fabricated as described below.

For microwave mode converters one of the biggest advantages of the present invention is that the designed mode converters are very compact and short in size compared to earlier designs based on periodic wall perturbations (grating structures). There are two design parameters that affect the overall length of the designed mode converter, $\Delta s_{min}$ and $r_{max}$. By reducing $\Delta s_{min}$ and by increasing $r_{max}$ the overall length of the mode converter can be reduced. There are, however, practical limits on the minimum value of $\Delta s_{min}$ and the maximum value of $r_{max}$. The value of $\Delta s_{min}$ is restricted by the fabrication procedure, material used, and fabrication errors. Whereas the maximum value of $r_{max}$ is restricted by the available computation time and physical restrictions on the radial size of the structure depending upon its usage.

Instead of using earlier techniques of pre-forming or molding for the fabrication of microwave mode converters, as with the periodic structures discussed above, a new modular approach to the construction of waveguide mode converters may preferably be used. In this approach the structure of the mode converter is discretized along the z dimension as shown in FIG. 6. Each discretized section is then like a disc which can be machined individually. All the discretized sections can then be put together inside a housing to assemble the complete structure. It was to demonstrate this idea that step functions were used in the design procedure for the $TE_{11}$ to $TM_{11}$ mode converter. Continuous basis functions could have also been used in the design (e.g., sine functions). In that case the continuous structure of the mode converter would have to be discretized to implement the modular fabrication method. In such a discretization the difference in the radius of two consecutive discs and the width of every disc will have to be kept less than about one-twentieth of a wavelength. This is required to maintain an accurate representation of the continuous surface by using a very small step size compared to a wavelength. This will increase the number of discs to be machined. To keep the demonstration of the idea simple, discontinuous basis functions have been used which reduce the number of required discs in the structure.

Figure 7:
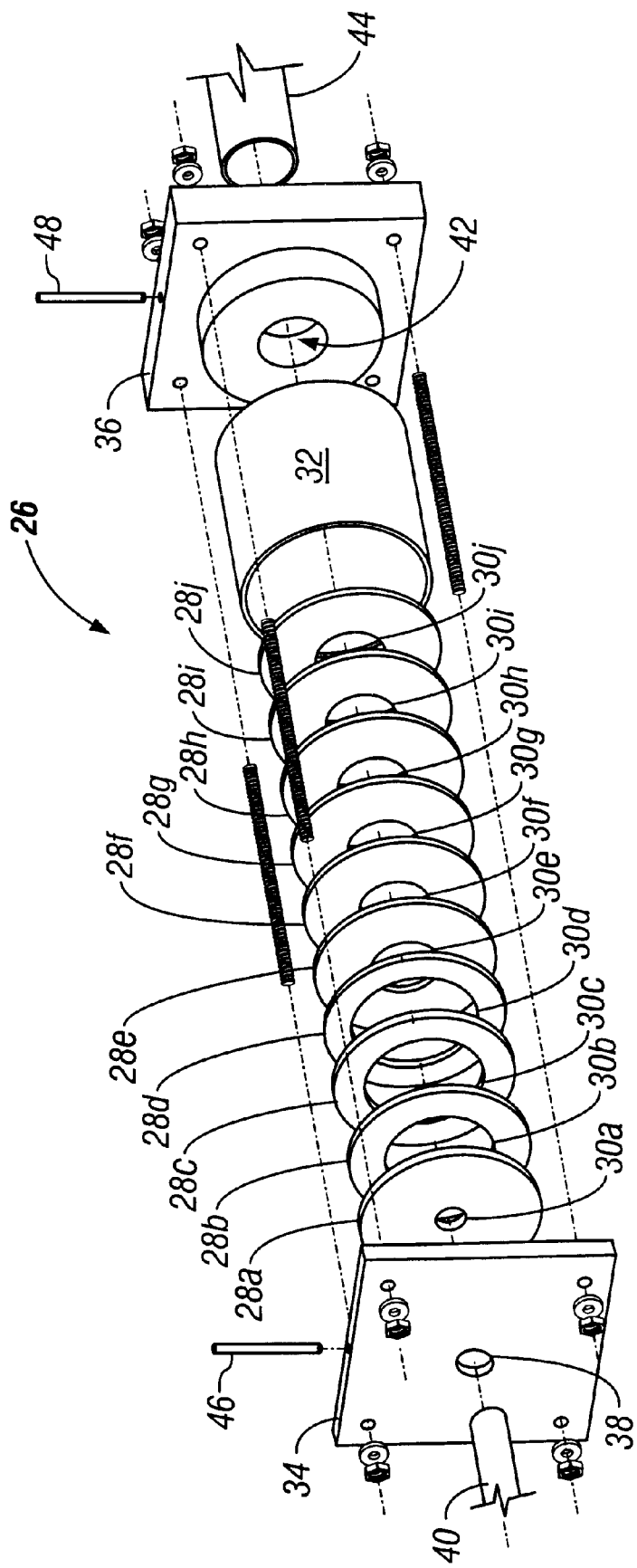
FIG. 7 is an exploded diagram showing the construction of a mode converter in accordance with a presently preferred embodiment of the present invention.

The assembly of the mode converter 26 is shown in an exploded view in FIG. 7. The thickness of each disc 28a, 28b, 28c, 28d, 28e, 28f, 28g, 28h, 28i, 28j in the preferred mode converter of FIG. 6 is 0.2505" and there are a total of 10 discs. An aluminum sheet with thickness slightly greater than 0.25" is machined on both sides to smooth its surfaces and to have a uniform thickness of 0.2505". A precision grinding machine is used for this purpose. Ten squares with side dimension slightly greater than 4.44" are cut out of the aluminum sheet. The square sections are then machined to make them into circular discs, each of which has a outer diameter of 4.44". This is the ID (inner diameter) of a 4.5" OD (outer diameter) aluminum tube 32 that will house these discs for concentricity. Appropriate sized holes 30a, 30b, 30c, 30d, 30e, 30f, 30g, 30h, 30i, 30j are drilled in the center of each square (the radii of these holes are the same as the optimized radii of discs in the mode converter design).

Figure 8:
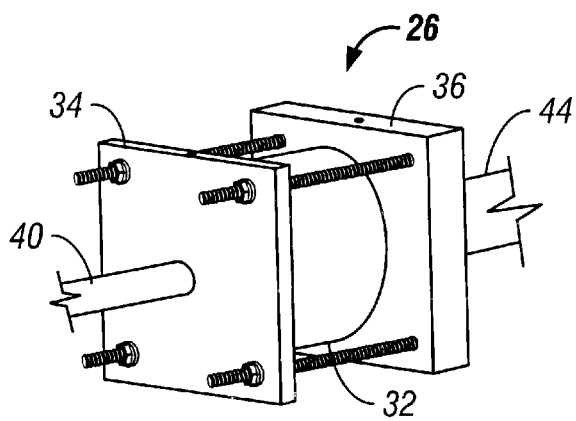
FIG. 8 is a diagram showing an assembled version of the mode converter in accordance with FIG. 7.

The ten discs are press fit into aluminum tube 32. The length of aluminum tube 32 is about 1.5" larger than the total length of the mode converter 26 (2.505"). This space is to slide in the input and output waveguide support units 34, 36, respectively. These support units are machined out of thick aluminum pieces. The input unit 34 has a center hole 38 large enough for the input waveguide 40 while the output unit 36 has a hole 42 to slide in the output waveguide 44. The input and output adapters have vertical set screws 46, 48 to hold the two waveguides 40, 44 in place. The input and output waveguides 40, 44 are preferably pieces of commercially available copper and brass tubing with average OD 0.875" and 1.75", respectively, and with wall thicknesses of 0.032" and 0.063", respectively. The whole structure of the mode converter is assembled together by a set of four through holes, nuts and bolts as shown in FIG. 7. The fully assembled mode converter 26 is shown in FIG. 8.

The radii of the input and output waveguides 40, 44, respectively, are 0.3895" and 0.8120". The radii of the holes in discs 28a–28j for this particular application are, respectively, 0.3543", 1.2874", 1.5630", 1.5748", 0.8268", 0.9055", 0.8268", 0.9055", 0.9449" and 0.7756".

All components used in this design were commercially available and no special machines were used in the procedure. Due to this reason the cost of fabrication was very low, unlike more conventional mode converters.

Figure 9:
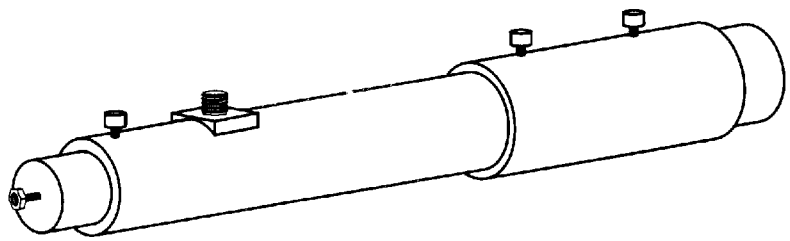
FIGS. 9 and 10 depict an SMA wave launcher in accordance with a presently preferred embodiment of the present invention.
Figure 10:
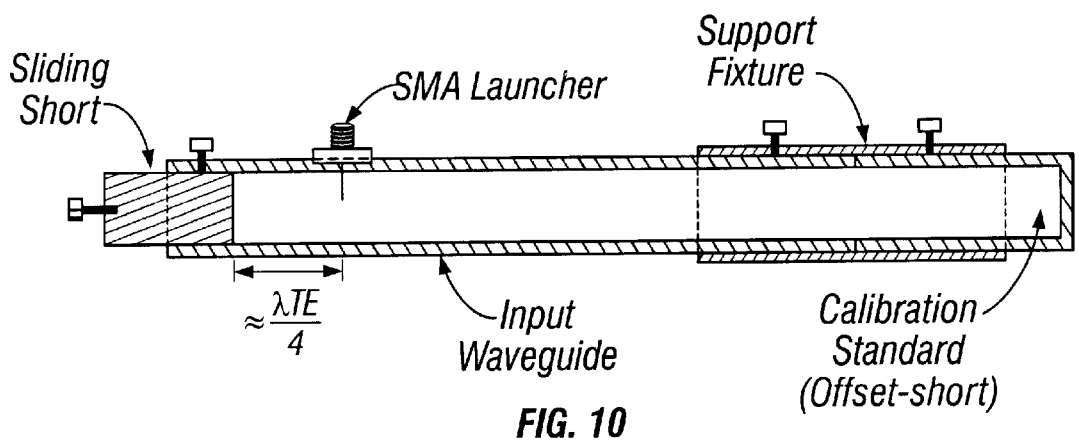

In order to test the performance of the mode converter a $TE_{11}$ mode was first excited in the input waveguide 40. A microwave source having a coaxial cable output was used for this purpose. An extended center-pin SMA launcher shown in FIGS. 9–10 was mounted on the side wall of the input waveguide of the mode converter. The radius of the input waveguide is such that at 9.94 GHz it only supports the dominant $TE_{11}$ mode. The SMA launcher, due to its impedance mismatch with the waveguide, not only launches the $TE_{11}$ mode but also a number of higher order evanescent modes into the waveguide. The length of the input waveguide from the SMA launcher to the input plane of the mode converter is selected to be large enough so that any evanescent modes have negligible amplitude at the mode converter plane. Thus is ensured a pure $TE_{11}$ mode at the input of the mode converter. The output of the mode converter was tested using a far field measurement technique and was found to give a 98.1% conversion efficiency to $TM_{11}$ mode, which is very close to the calculated value of 99.5%.

Discussion of Initial Structure Approximation

It is logical to ask how arbitrary and wrong can the initial guess be and still have the process work? A solution will be found regardless of the initial guess for the iterative optimization solution. How good the solution is depends on the type of optimization and the closeness of the initial guess to the final, good solution. With the optimization solution in a mode converter application, the goal is to maximize the power in the desired output mode, thereby minimizing the power in all other reflected and transmitted modes. Another way to view this is that the wasted power is being minimized. The optimization surface, which is a function of the variables used (such as waveguide dimension), is very rough, meaning that there are many local minima, i.e., valleys whose minima are larger than others (which may be close to the desired zero wasted power and hence global solution). The goal of an optimization routine would be to find the global minimum by jumping out of the local valleys in search of a global solution, meaning the best given the parameter search space. If the optimization algorithm is very good, any initial guess can be used. Many approaches are available to accomplish this task in addition to those described herein.

Figure 11:
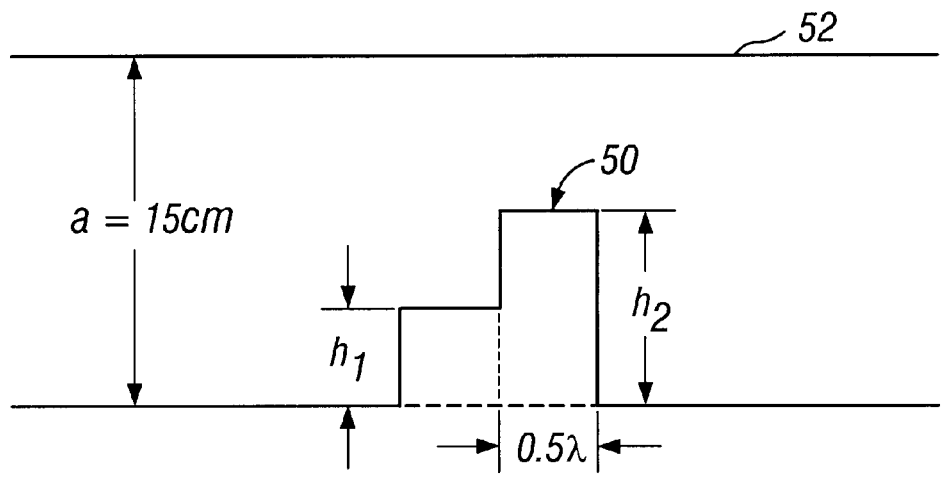
FIG. 11 is a diagram illustrating a simplified scattering structure within a parallel plate waveguide in accordance with a presently preferred embodiment of the present invention.
Figure 12:
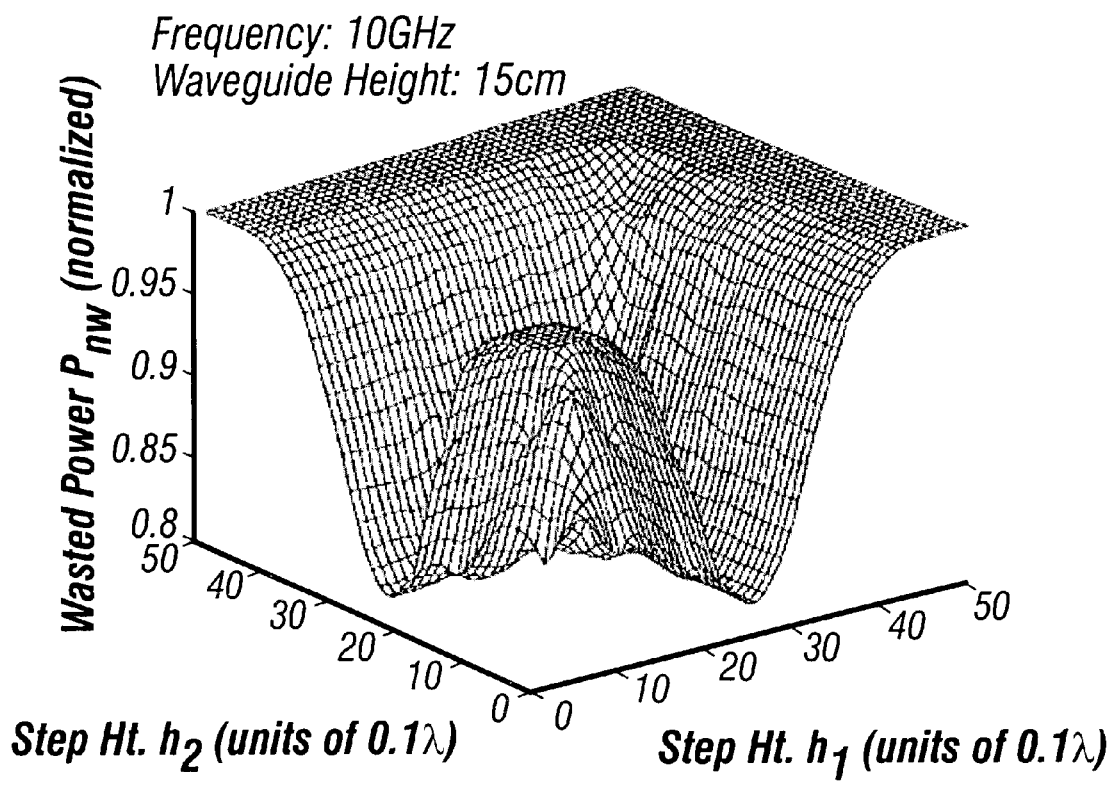
FIG. 12 is a diagram illustrating an optimization surface for $TE_1$ to $TE_2$ conversion in accordance with the scatterer of FIG. 11.

FIG. 11 shows an example of a simple scattering body 50 within a waveguide 52 of diameter 15 cm at a center frequency of 10 GHz. Scattering body 50 is formed of two 0.5 λ-thick sections, one of height $h_1$ and the other of height $h_2$. The z dimension of each is the same. In FIG. 12 is shown the optimization surface for $TE_1$ to $TE_2$ conversion for the situation depicted in FIG. 11. This is a very simple case. As can be seen easily in FIG. 12, the wasted power is depicted as increasing along the vertical axis in the upward direction. The goal of optimization of $P_0$, for example, is to obtain a solution with a low value of wasted power (optimized $P_0$). Thus the "lower" points on the optimization surface which correspond to the indicated step heights for $h_1$ and $h_2$ in units of 0.1λ are "better" places to be than the local maxima of wasted power. While a "best" solution may be impossible or difficult to achieve under many circumstances, many good solutions are available. Thus one reason for pursuing several different starting points is to ensure that one of the "good" solutions will be obtained, rather than a mere local minimum of the surface.

Figure 13:
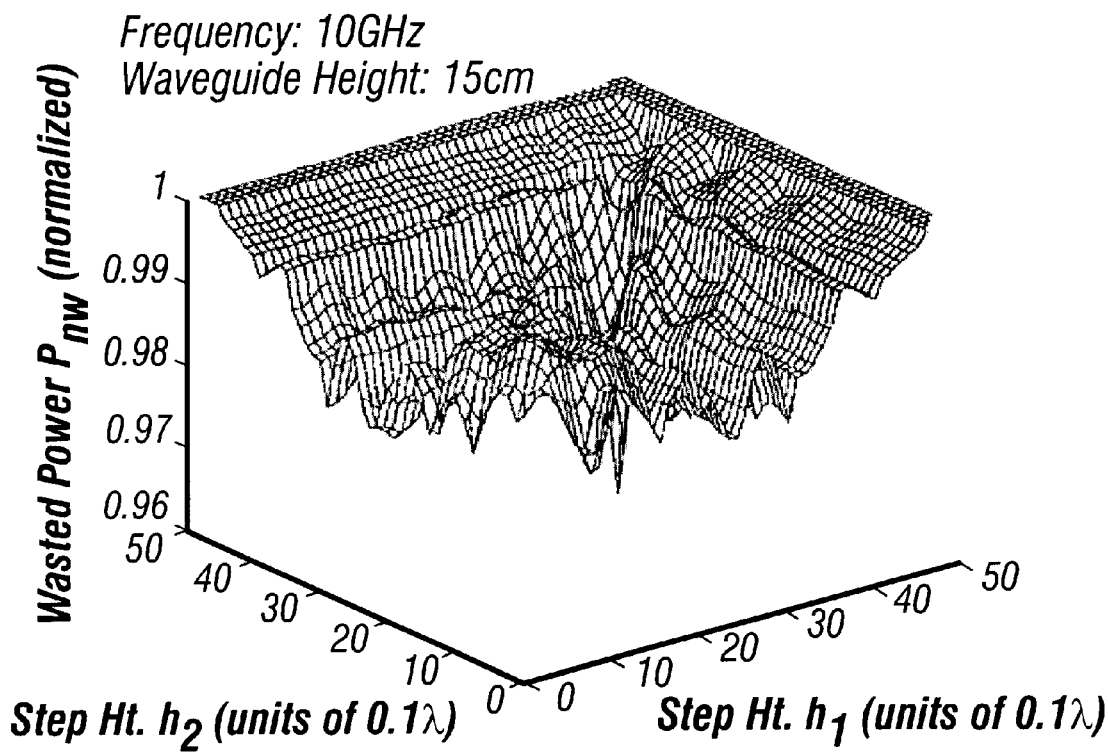
FIG. 13 is a diagram illustrating an optimization surface for $TE_1$ to $TE_6$ conversion in accordance with the scatterer of FIG. 11.

FIG. 13 depicts an optimization surface for $TE_1$ to $TE_6$ mode conversion under the circumstances of FIG. 11. As can be seen, the surface here is much more complex than that of FIG. 12 with many more local minima demonstrating the desirability of starting from a variety of initial points to guarantee a "good" solution.

Alternative Embodiments

A number of different solutions to mode conversion and control have been obtained to date. Several of these are shown in the figures.

Figure 14:
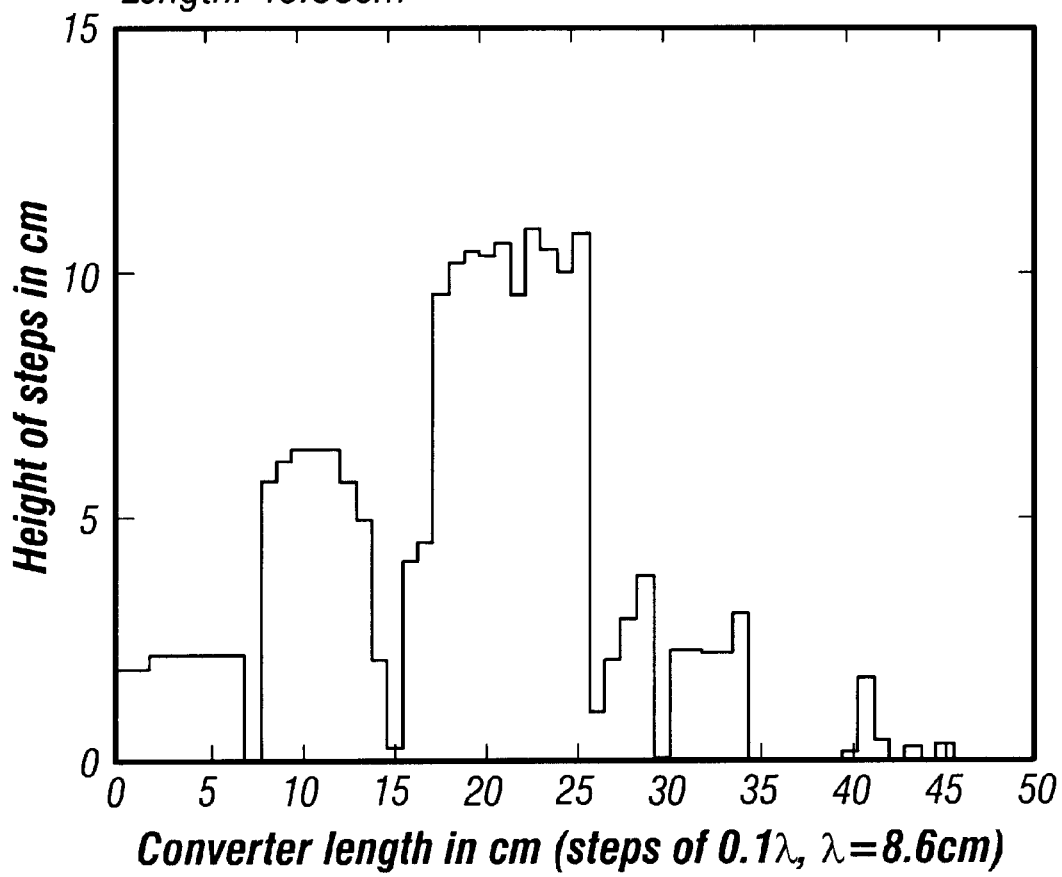
FIG. 14 is a diagram showing the construction of a $TE_1$ to $TE_2$ converter in a parallel plate waveguide in accordance with a presently preferred embodiment of the present invention.

FIG. 14 is a diagram showing the construction of a parallel plate waveguide $TE_1$ to $TE_2$ converter in accordance with a presently preferred embodiment of the present invention.

Figure 15:
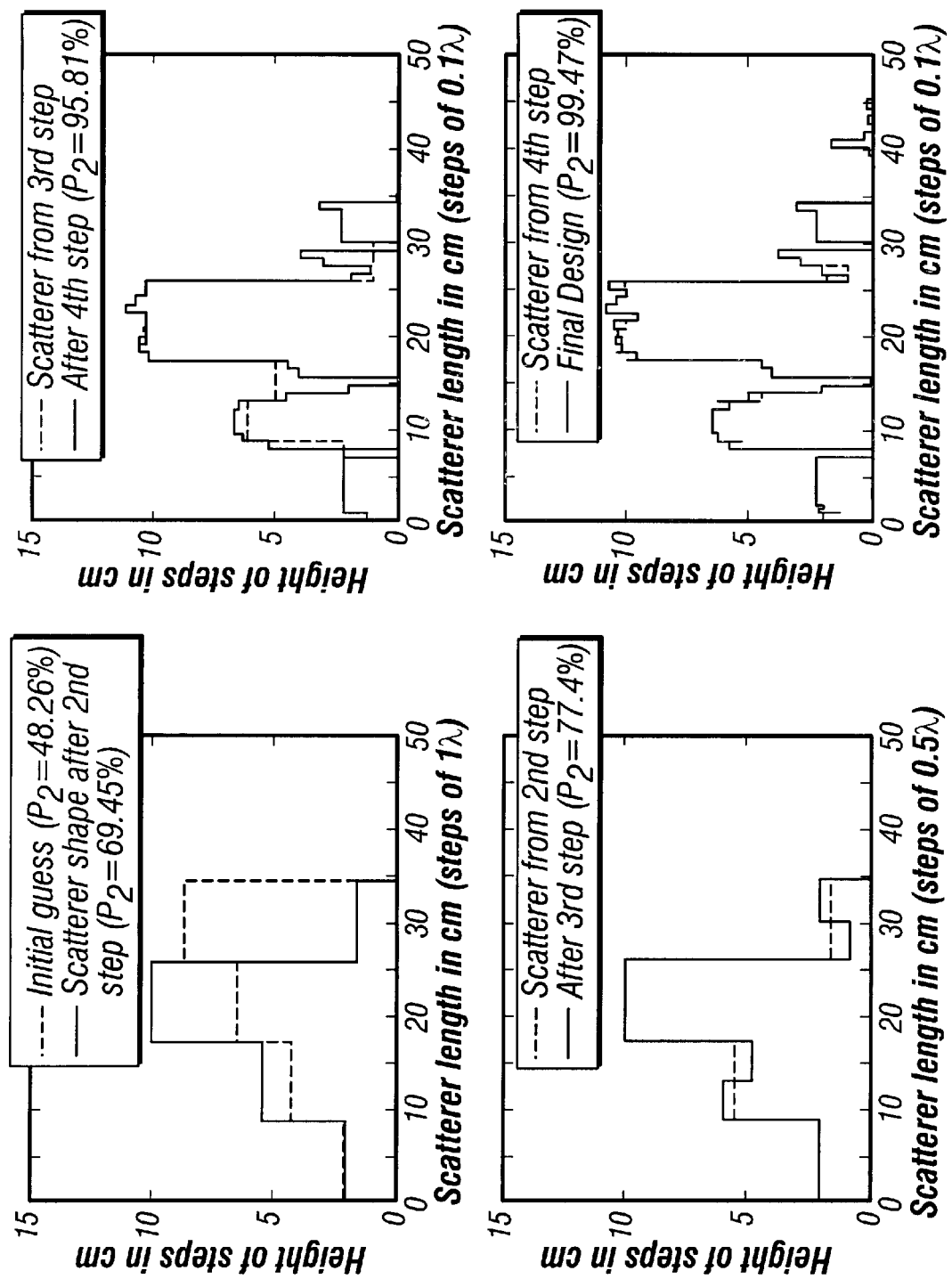
FIG. 15 is a series of four diagrams showing the sequence of optimization of the structure for a $TE_1$ to $TE_2$ mode converter structure in a parallel plate waveguide in accordance with a presently preferred embodiment of the present invention.

FIG. 15 is a series of four diagrams showing the sequence of optimization of the structure for a parallel plate waveguide $TE_1$ to $TE_2$ mode converter structure in accordance with a presently preferred embodiment of the present invention.

Figures 16, 17:
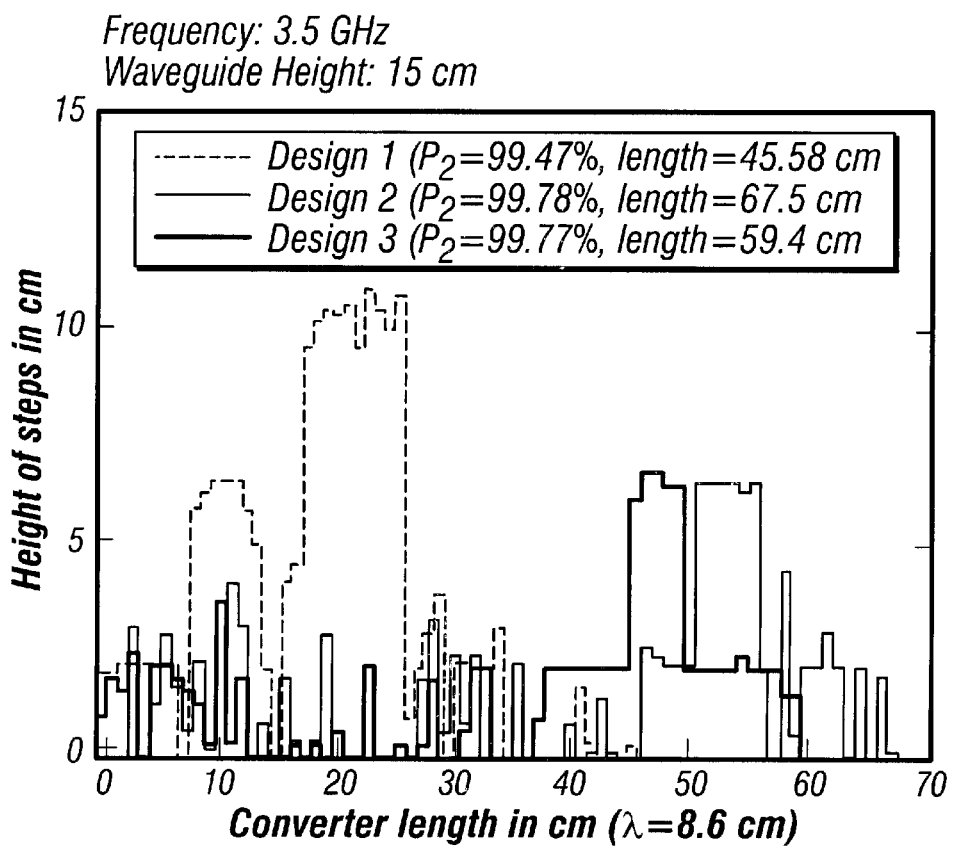
FIG. 16 is a diagram comparing three distinct designs for a $TE_1$ to $TE_2$ mode converter structure in a parallel plate waveguide in accordance with a presently preferred embodiment of the present invention.
FIG. 17 is a chart comparing performance parameters of the three distinct designs shown in FIG. 16.

FIG. 16 is a diagram comparing three distinct designs for a parallel plate waveguide $TE_1$ to $TE_2$ mode converter structure in accordance with a presently preferred embodiment of the present invention.

FIG. 17 is a chart comparing performance parameters of the three distinct designs shown in FIG. 16.

Figure 18:
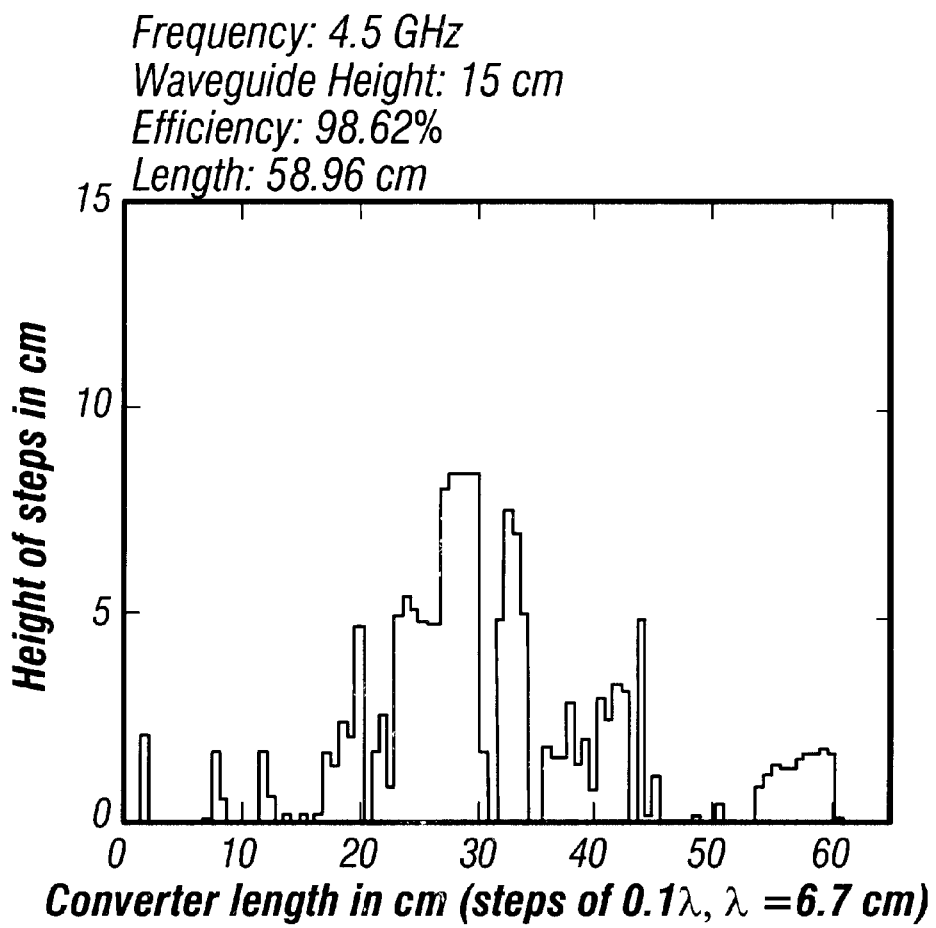
FIG. 18 is a diagram showing the structure of a $TE_1$ to $TE_2$ mode converter structure in a parallel plate waveguide in accordance with a presently preferred embodiment of the present invention.

FIG. 18 is a diagram showing the structure of a parallel plate waveguide $TE_1$ to $TE_2$ mode converter structure in accordance with a presently preferred embodiment of the present invention.

FIG. 19 is a diagram showing the structure of a circular waveguide $TE_{02}$ to $TE_{01}$ mode converter structure in accordance with a presently preferred embodiment of the present invention.

FIG. 20 is a plot of efficiency versus frequency for the circular waveguide $TE_{02}$ to $TE_{01}$ mode converter structure of FIG. 19.

FIG. 21A is a plot of width profile versus distance along the z direction for a prior art circular waveguide $TE_{02}$ to $TE_{01}$ mode converter in accordance with M. J. Buckley, et al., "A Single Period $TE_{02}$ to $TE_{01}$ mode converter in a highly overmoded circular waveguide," *I.E.E.E. Transactions on Microwave Theory and Techniques,* Vol. 39, No. 8 (August 1991), pp. 1301–1306.

FIG. 21B is a plot of efficiency versus frequency (GHz) for a prior art circular waveguide $TE_{02}$ to $TE_{01}$ mode converter in accordance with M. J. Buckley, et al., "A Single Period $TE_{02}$ to $TE_{01}$ mode converter in a highly overmoded circular waveguide," *I.E.E.E. Transactions on Microwave Theory and Techniques,* Vol. 39, No. 8 (August 1991), pp. 1301–1306.

FIG. 22 is a chart comparing the length and conversion efficiency of the "Previous" design of FIGS. 21A and 21B with the "Present" design of FIGS. 19 and 20.

FIG. 23 is a diagram of a grating design for a circular waveguide $TE_{06}$ to $TE_{01}$ mode converter for operation at 140 GHz in accordance with a presently preferred embodiment of the present invention.

FIG. 24 is a plot of efficiency versus frequency (GHz) for a prior art circular waveguide $TE_{06}$ to $TE_{01}$ mode converter for operation at 140 GHz in accordance with K. Kumric, et al., "Optimization of Mode Converters for Generating the Fundamental $TE_{01}$ Mode from $TE_{06}$ Gyrotron Output at 140 GHz, " *International Journal of Electronics,* Vol. 64 (January 1988), pp. 77–94.

FIG. 25 is a chart comparing the length and conversion efficiency of the "Previous" design of FIG. 24 with the "Present" design of FIG. 23.

FIG. 26 is a pair of diagrams comparing a pair of designs for a circular waveguide $TE_{11}$ to $TM_{11}$ mode converter structure each designed in accordance with a presently preferred embodiment of the present invention.

FIG. 27 is a chart comparing the length and conversion efficiency and other performance parameters of the "Design 1" design of FIG. 26 with the "Design 2" design of FIG. 26.

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A mode control device for coupling a first circular microwave waveguide supporting a first set of modes to a second circular microwave waveguide supporting a second set of modes, said second set of modes being different from said first set of modes, said mode control device comprising:

a first disk having a first aperture of a first radius;

a second disk adjacent said first disk having a second aperture of a second radius, said second radius being different from said first radius; and a third disk adjacent said second disk having a third aperture of a third radius, said third radius being different from said second radius and said first radius, said disks disposed so that electromagnetic energy from said first circular microwave waveguide passes through said first aperture and then through said second aperture and then through said third aperture and eventually into the second circular microwave waveguide, microwave energy within said first set of modes incident upon the device being scattered into said second set of modes in said second circular waveguide.

* * * * *